(12) United States Patent
Kimura

(10) Patent No.: US 10,133,042 B2
(45) Date of Patent: Nov. 20, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Tomonori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 15/340,500

(22) Filed: Nov. 1, 2016

(65) Prior Publication Data

US 2017/0123194 A1 May 4, 2017

(30) Foreign Application Priority Data

Nov. 4, 2015 (JP) ................. 2015-216449

(51) Int. Cl.
*G02B 15/20* (2006.01)
*G02B 7/10* (2006.01)
*G02B 27/00* (2006.01)
*G02B 15/173* (2006.01)

(52) U.S. Cl.
CPC ............... *G02B 15/20* (2013.01); *G02B 7/10* (2013.01); *G02B 15/173* (2013.01); *G02B 27/0025* (2013.01)

(58) Field of Classification Search
CPC ........ G02B 15/20; G02B 7/10; G02B 15/173; G02B 27/0025
USPC .......................................... 359/684
See application file for complete search history.

(56) References Cited

U.S. PATENT DOCUMENTS

| 9,146,388 B2 | 9/2015 | Kimura |
| 2014/0300782 A1* | 10/2014 | Kimura ............... G02B 15/163 348/240.3 |
| 2015/0054988 A1 | 2/2015 | Kimura et al. |

FOREIGN PATENT DOCUMENTS

| JP | H07-270684 A | 10/1995 |
| JP | 2007-178598 A | 7/2007 |
| JP | 2007-248952 A | 9/2007 |
| JP | 2010-048855 A | 3/2010 |
| JP | 2012-128116 A | 7/2012 |

* cited by examiner

*Primary Examiner* — Bumsuk Won
*Assistant Examiner* — Wen Huang
(74) *Attorney, Agent, or Firm* — Carter, DeLuca, Farrell & Schmidt, LLP

(57) ABSTRACT

A zoom lens has, in order from an object side to an image side, a positive first lens unit, a negative second lens unit, a positive third lens unit, a positive fourth lens unit, and a fifth lens unit. In the zoom lens, the loci of the lens units moving for zooming are set appropriately, and a reflector for bending an optical path is placed at an appropriate position within the fifth lens unit.

20 Claims, 11 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is advantageously applicable to an image pickup apparatus that uses an image pickup element, such as a video camera, an electronic still camera, a broadcasting camera, or a monitoring camera, or an image pickup apparatus such as a silver-halide film camera.

Description of the Related Art

A zoom lens for use in an image pickup apparatus is desired to be compact, have a high zoom ratio, and have a high resolving power over the entire zoom range. As a zoom lens for achieving a high zoom ratio, a positive-lead type zoom lens is known, in which a lens unit having a positive refractive power is placed at a position closest to an object.

Japanese Patent Application Laid-Open No. H07-270684 discloses a four-unit zoom lens including, in order from an object side to an image side, first to fourth lens units having positive, negative, positive, and positive refractive powers, respectively.

Japanese Patent Application Laid-Open No. 2007-178598 discloses a five-unit zoom lens including, in order from the object side to the image side, first to fifth lens units having positive, negative, positive, positive, and positive refractive powers, respectively. Japanese Patent Application Laid-Open No. 2012-128116 discloses a five-unit zoom lens including, in order from the object side to the image side, first to fifth lens units having positive, negative, positive, positive, and negative refractive powers, respectively.

Meanwhile, Japanese Patent Application Laid-Open Nos. 2007-248952 and 2010-48855 each disclose a zoom lens in which a reflection member configured to bend the optical axis of the zoom lens is placed on an optical path with an aim to reduce the thickness of an image pickup apparatus.

For a zoom lens having such a reflection member, it is important to appropriately set lens configurations, the position of the reflection member, and so on.

For example, placing the reflection member in a front part of a lens system reduces the depth dimension of the lens system. In this case, however, large space is necessary in the image side of the reflection member to place multiple lens units that move for zooming in a direction perpendicular to the optical axis of incident light on the lens system, and the width dimension of the camera tends to increase to create such large space. Not only the width dimension, but also the height dimension of the camera tends to increase due to the necessity of creating space in the height direction as well.

SUMMARY OF THE INVENTION

A zoom lens of the present invention comprises, in order from an object side to an image side, a first lens unit having a positive refractive power, a second lens unit having a negative refractive power, a third lens unit having a positive refractive power, a fourth lens unit having a positive refractive power, and a fifth lens unit. The fifth lens unit does not move for zooming, and at least the second lens unit and the fourth lens unit move during zooming to change an interval between the third lens unit and the fourth lens unit and an interval between the fourth lens unit and the fifth lens unit such that an interval between the first lens unit and the second lens unit at a telephoto end is larger than that at a wide angle end and an interval between the second lens unit and the third lens unit at the telephoto end is smaller than that at the wide angle end. The fifth lens unit includes, in order from the object side to the image side, a first lens subunit having a negative refractive power, a reflector that bends an optical path, and a second lens subunit having a positive refractive power. The zoom lens satisfies the following conditional expression:

$$0.40 < -d5ab/f5a < 1.00$$

where $f5a$ is a focal length of the first lens subunit and $d5ab$ is an optical distance of an interval between the first lens subunit and the second lens subunit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinbelow, a zoom lens and an image pickup apparatus including the zoom lens are described. The zoom lens of the present invention includes, in order from an object side to an image side, a first lens unit having a positive refractive power, a second lens unit having a negative refractive power, a third lens unit having a positive refractive power, a fourth lens unit having a positive refractive power, and a fifth lens unit. The fifth lens unit does not move for zooming. At least the second lens unit and the fourth lens unit move during zooming.

The interval between the third lens unit and the fourth lens unit and the interval between the fourth lens unit and the fifth lens unit are changed during zooming so that the interval between the first lens unit and the second lens unit at a telephoto end (long focal length end) is larger than that at a wide angle end (short focal length end) and the interval between the second lens unit and the third lens unit at the telephoto end is smaller than that at the wide angle end. The fifth lens unit includes, in order from the object side to the image side, a first lens subunit having a negative refractive power, a reflector that bends an optical path, and a second lens subunit having a positive refractive power.

Figure 1:
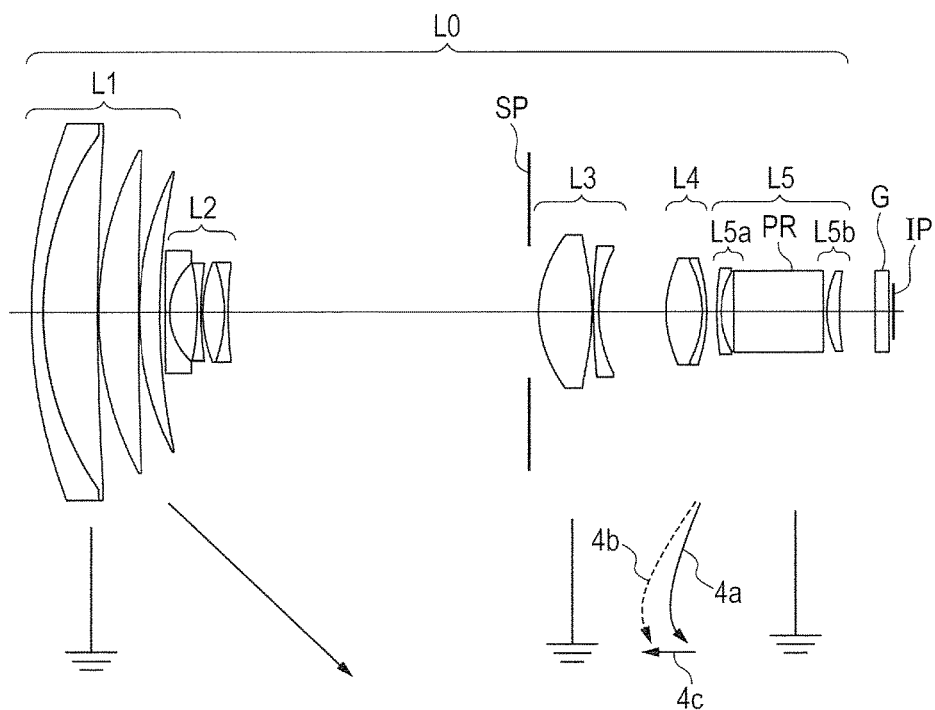
FIG. 1 is a lens sectional view of a zoom lens according to Embodiment 1 of the present invention at a wide angle end.
Figure 2A:
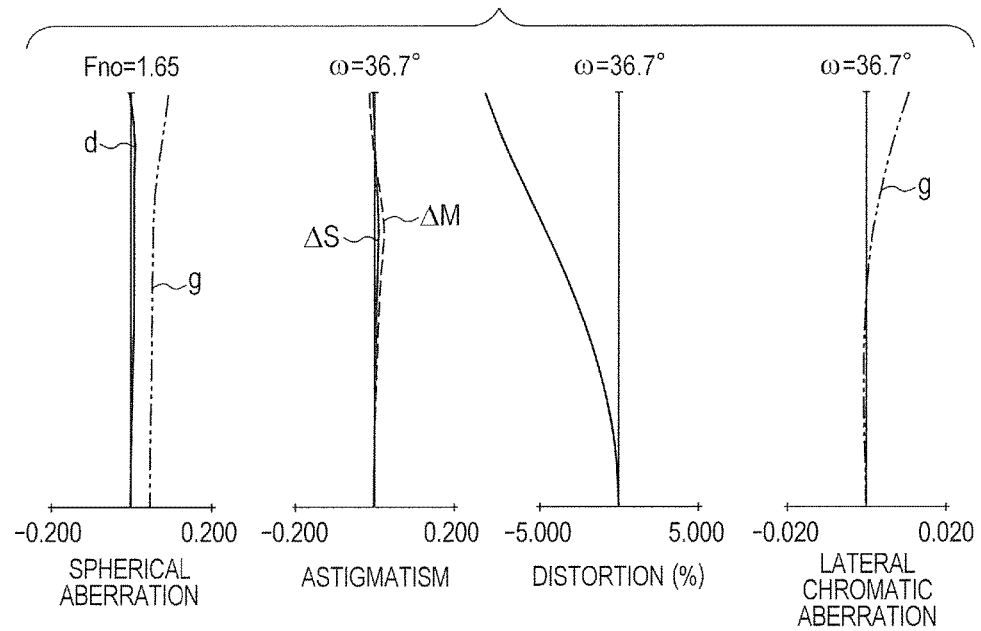
FIG. 2A is a diagram showing aberrations in the zoom lens according to Embodiment 1 of the present invention at the wide angle end.
Figure 2B:
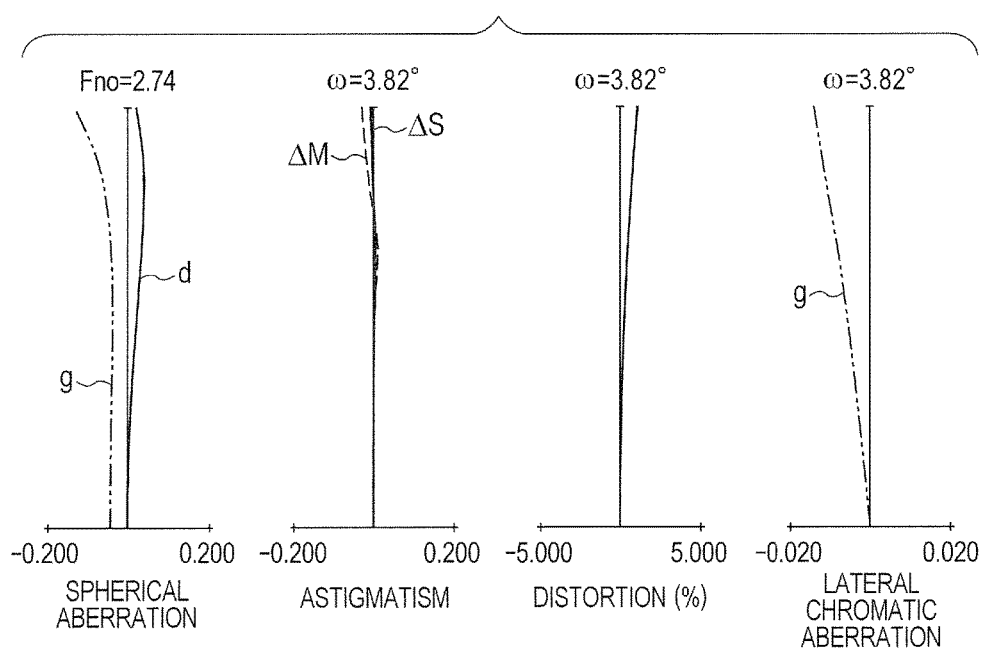
FIG. 2B is a diagram showing aberrations in the zoom lens according to Embodiment 1 of the present invention at a middle zoom position.
Figure 2C:
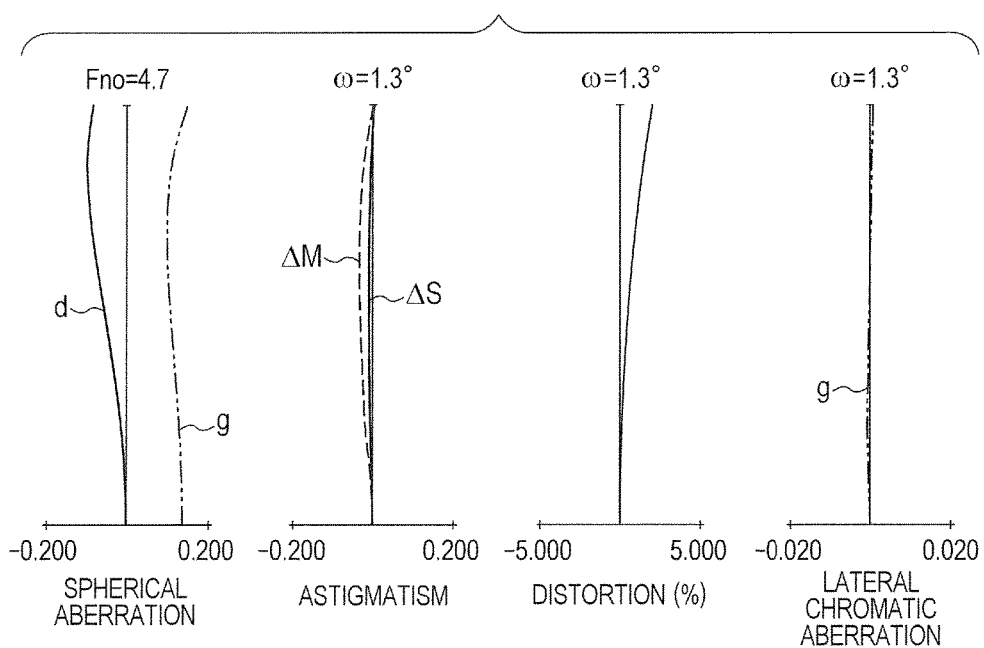
FIG. 2C is a diagram showing aberrations in the zoom lens according to Embodiment 1 of the present invention at a telephoto end.

FIG. 1 is a lens sectional view of a zoom lens according to Embodiment 1 of the present invention at the wide angle end. FIGS. 2A, 2B, and 2C are diagrams showing aberrations in the zoom lens according to Embodiment 1 at the wide angle end, a middle zoom position, and the telephoto end, respectively. The zoom lens of Embodiment 1 has a zoom ratio of 29.38 and an F-number of 1.65 to 4.70.

Figure 3:
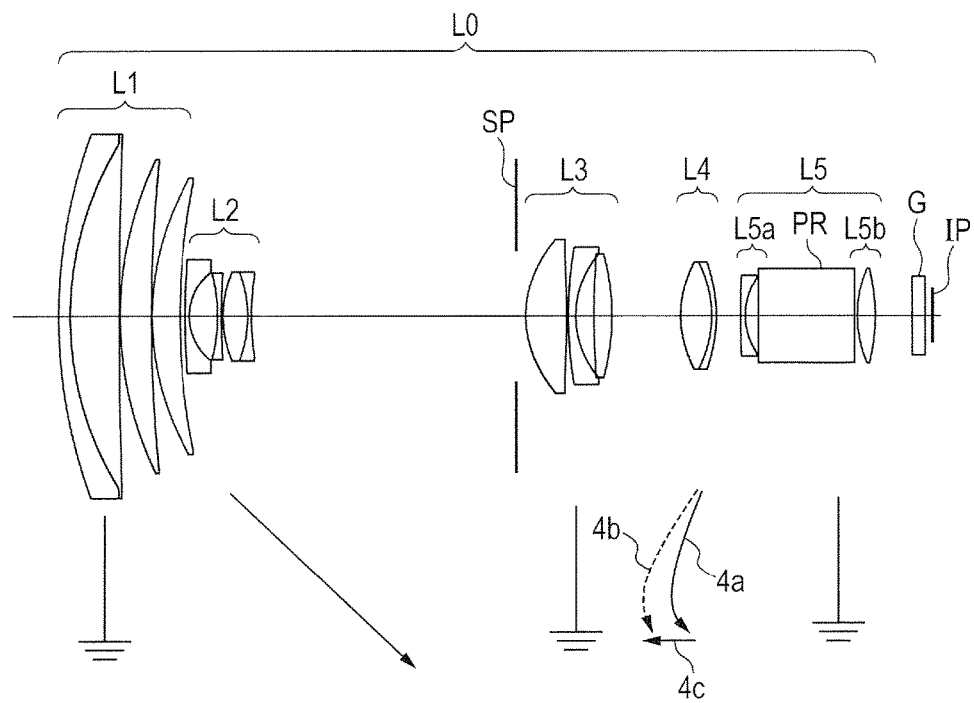
FIG. 3 is a lens sectional view of a zoom lens according to Embodiment 2 of the present invention at the wide angle end.
Figure 4A:
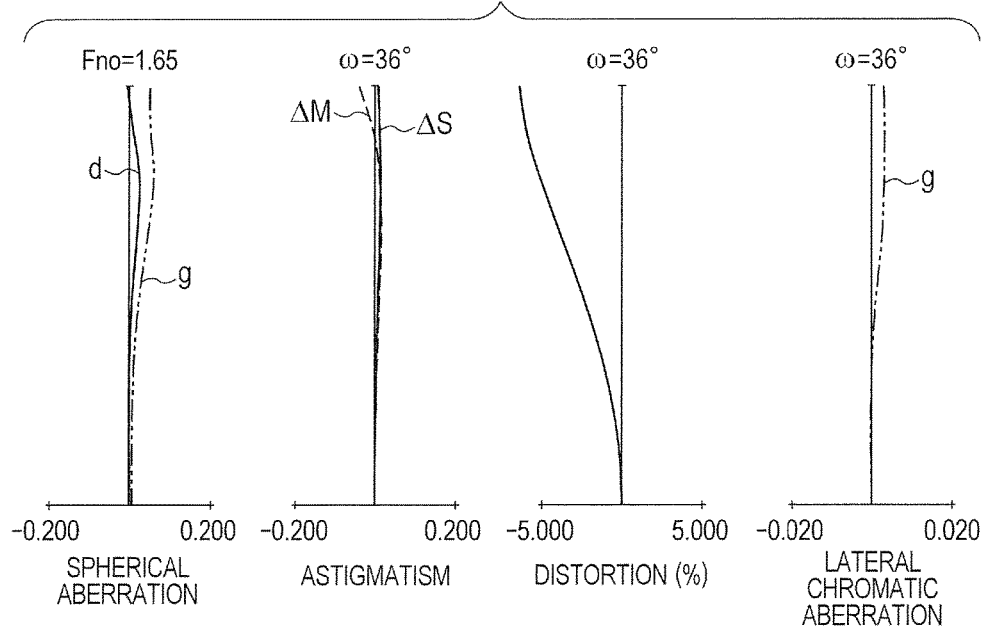
FIG. 4A is a diagram showing aberrations in the zoom lens according to Embodiment 2 of the present invention at the wide angle end.
Figure 4B:
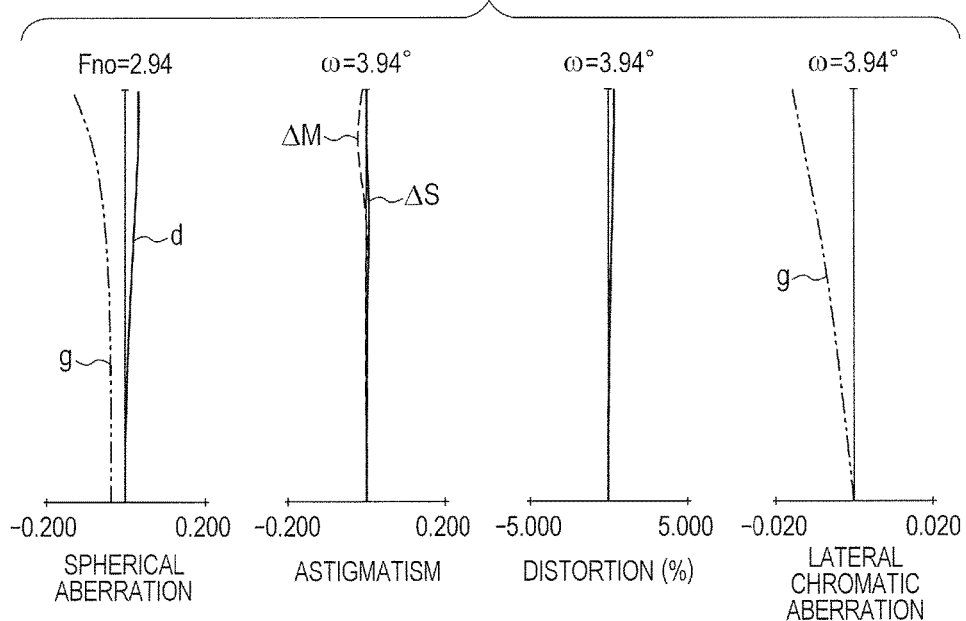
FIG. 4B is a diagram showing aberrations in the zoom lens according to Embodiment 2 of the present invention at the middle zoom position.
Figure 4C:
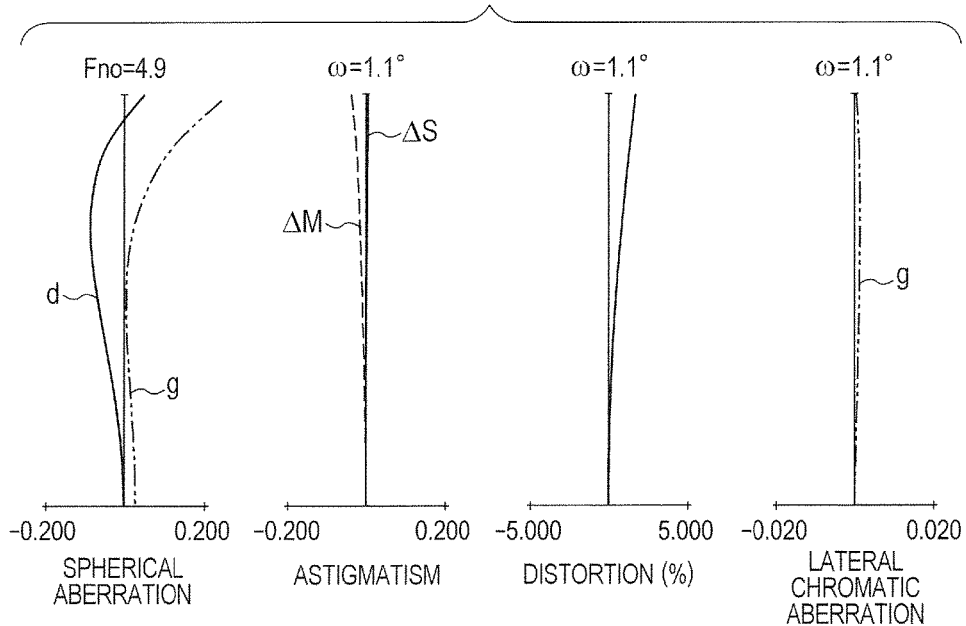
FIG. 4C is a diagram showing aberrations in the zoom lens according to Embodiment 2 of the present invention at the telephoto end.
Figure 5:
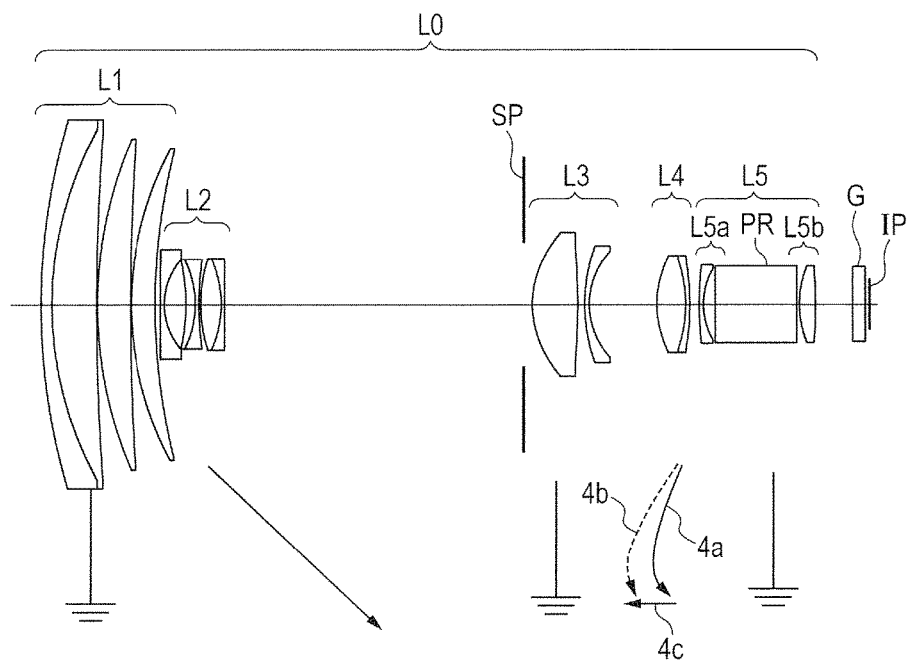
FIG. 5 is a lens sectional view of a zoom lens according to Embodiment 3 of the present invention at the wide angle end.
Figure 6A:
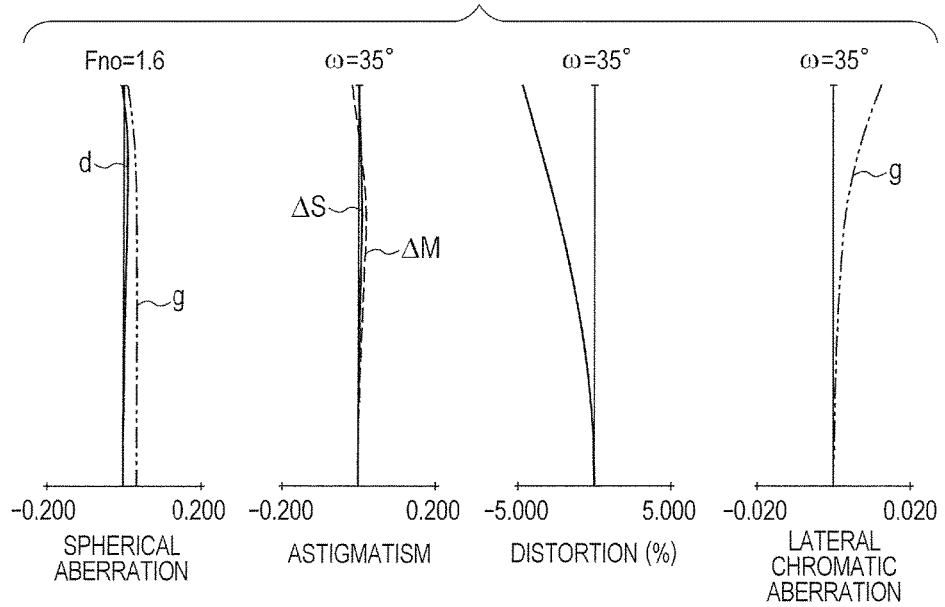
FIG. 6A is a diagram showing aberrations in the zoom lens according to Embodiment 3 of the present invention at the wide angle end.
Figure 6B:
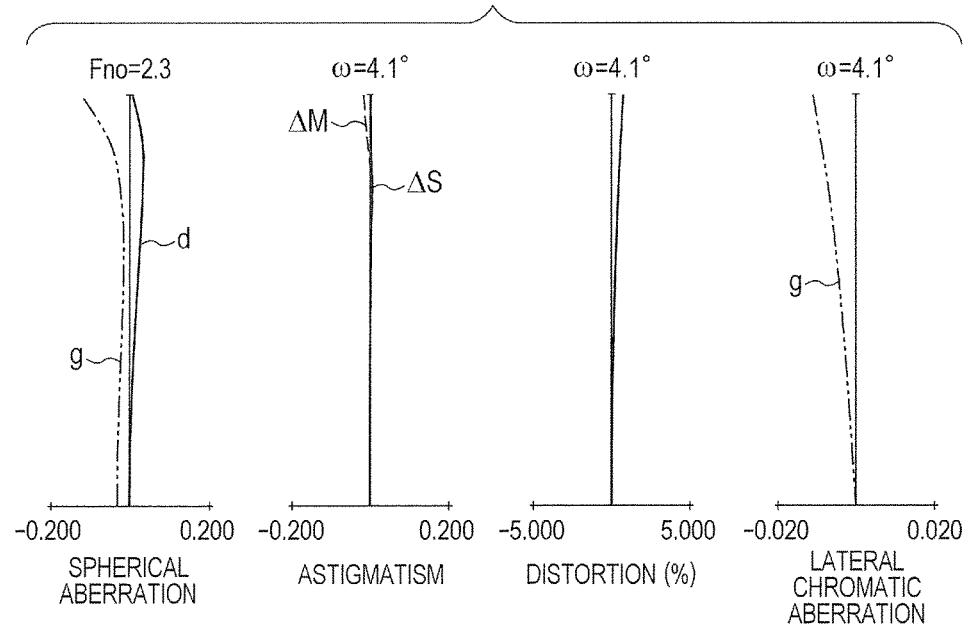
FIG. 6B is a diagram showing aberrations in the zoom lens according to Embodiment 3 of the present invention at the middle zoom position.
Figure 6C:
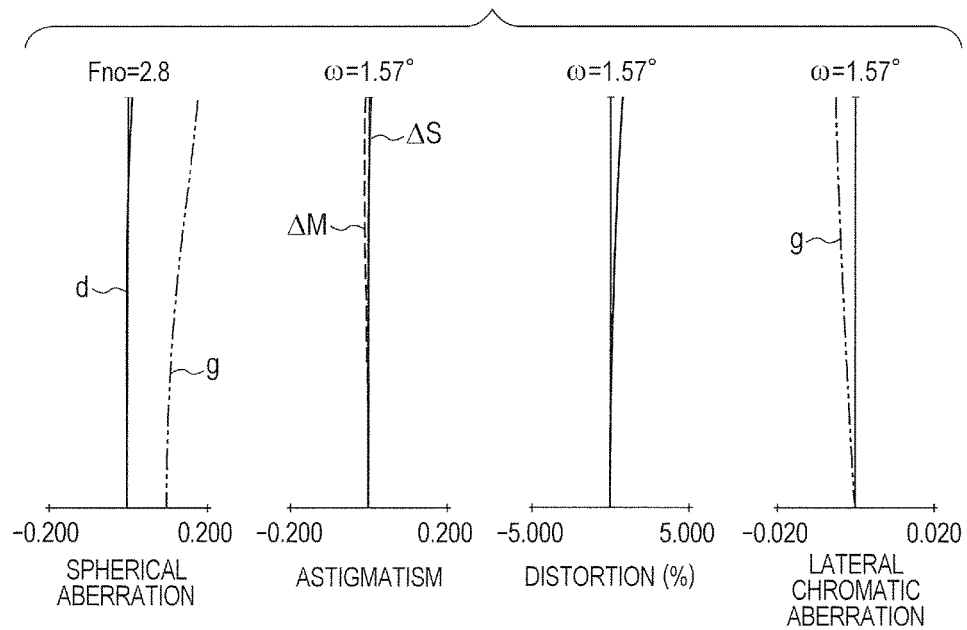
FIG. 6C is a diagram showing aberrations in the zoom lens according to Embodiment 3 of the present invention at the telephoto end.

FIG. 3 is a lens sectional view of a zoom lens according to Embodiment 2 of the present invention at the wide angle end. FIGS. 4A, 4B, and 4C are diagrams showing aberrations in the zoom lens according to Embodiment 2 at the wide angle end, the middle zoom position, and the telephoto end, respectively. The zoom lens of Embodiment 2 has a zoom ratio of 34.93 and an F-number of 1.65 to 4.90. FIG. 5 is a lens sectional view of a zoom lens according to Embodiment 3 of the present invention at the wide angle end. FIGS. 6A, 6B, and 6C are diagrams showing aberrations in the zoom lens according to Embodiment 3 at the wide angle end, the middle zoom position, and the telephoto end, respectively. The zoom lens of Embodiment 3 has a zoom ratio of 25.01 and an F-number of 1.60 to 2.80.

Figure 7:
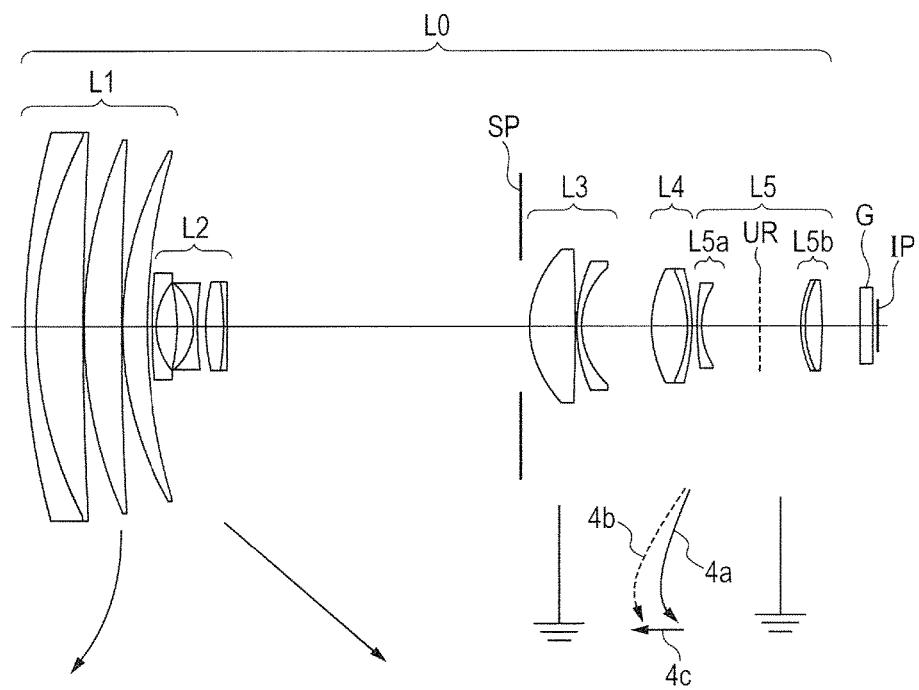
FIG. 7 is a lens sectional view of a zoom lens according to Embodiment 4 of the present invention at the wide angle end.
Figure 8A:
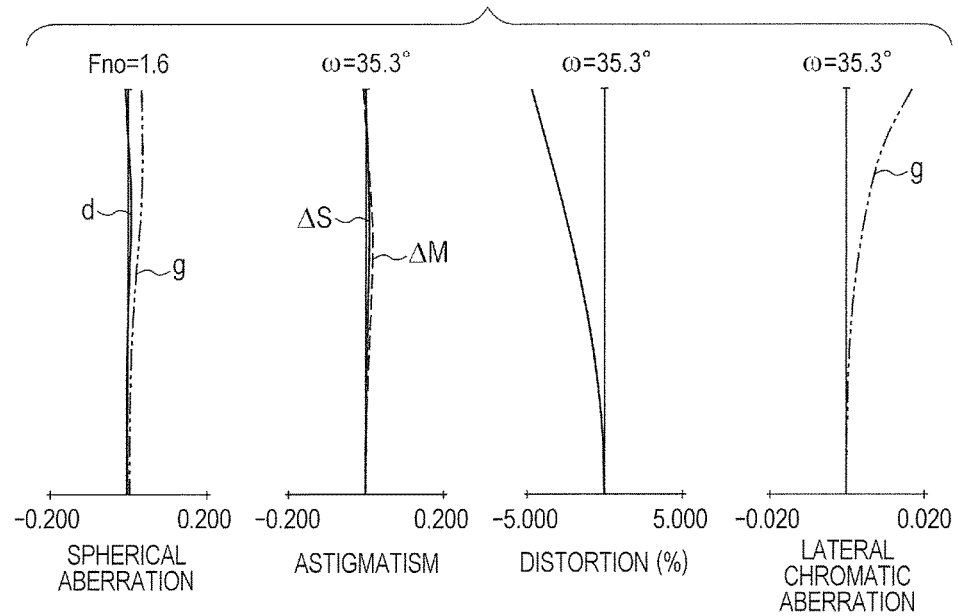
FIG. 8A is a diagram showing aberrations in the zoom lens according to Embodiment 4 of the present invention at the wide angle end.
Figure 8B:
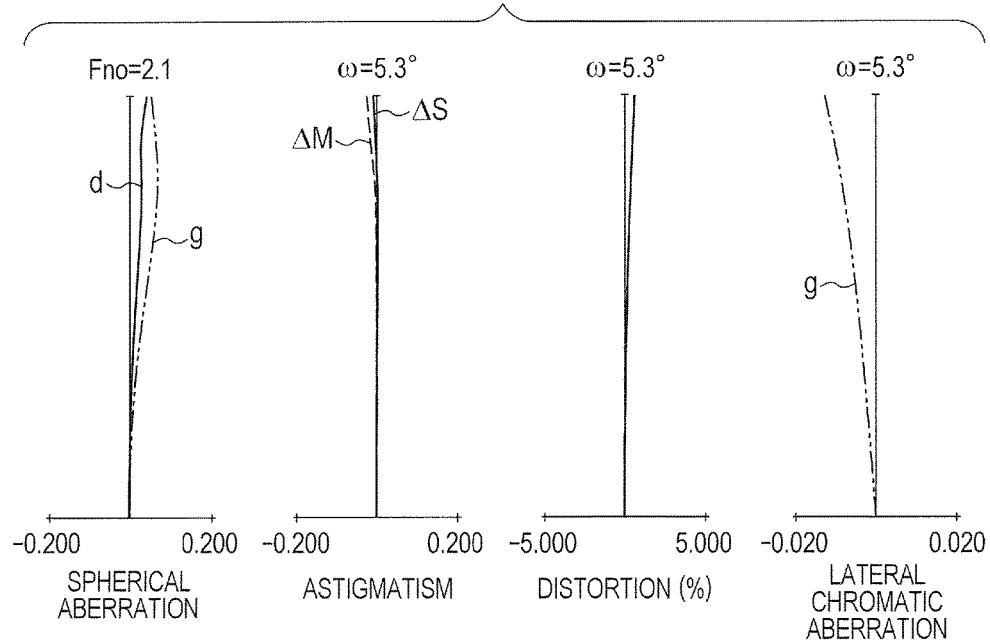
FIG. 8B is a diagram showing aberrations in the zoom lens according to Embodiment 4 of the present invention at the middle zoom position.
Figure 8C:
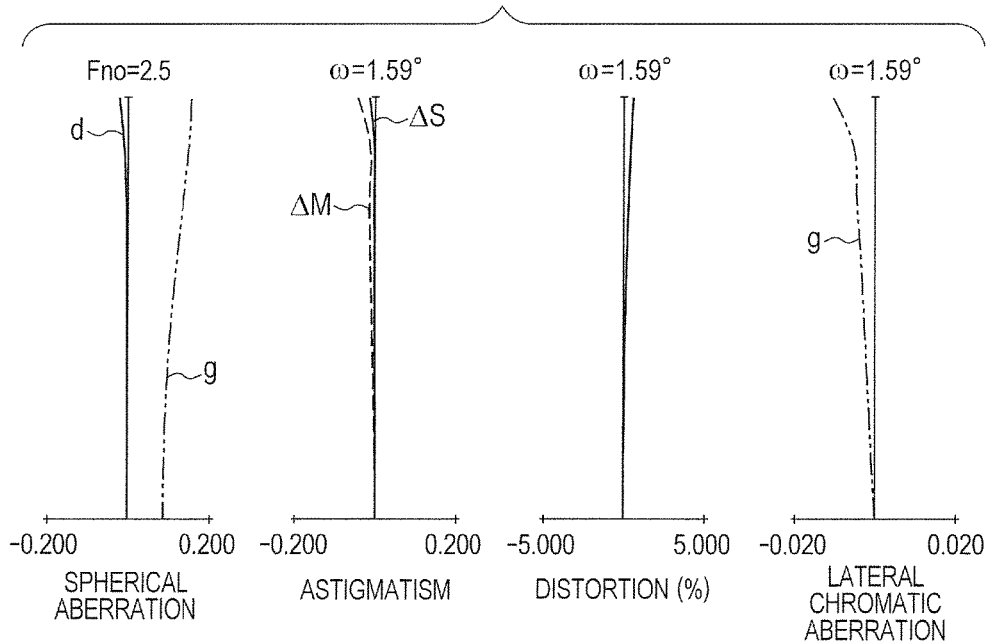
FIG. 8C is a diagram showing aberrations in the zoom lens according to Embodiment 4 of the present invention at the telephoto end.
Figure 9:
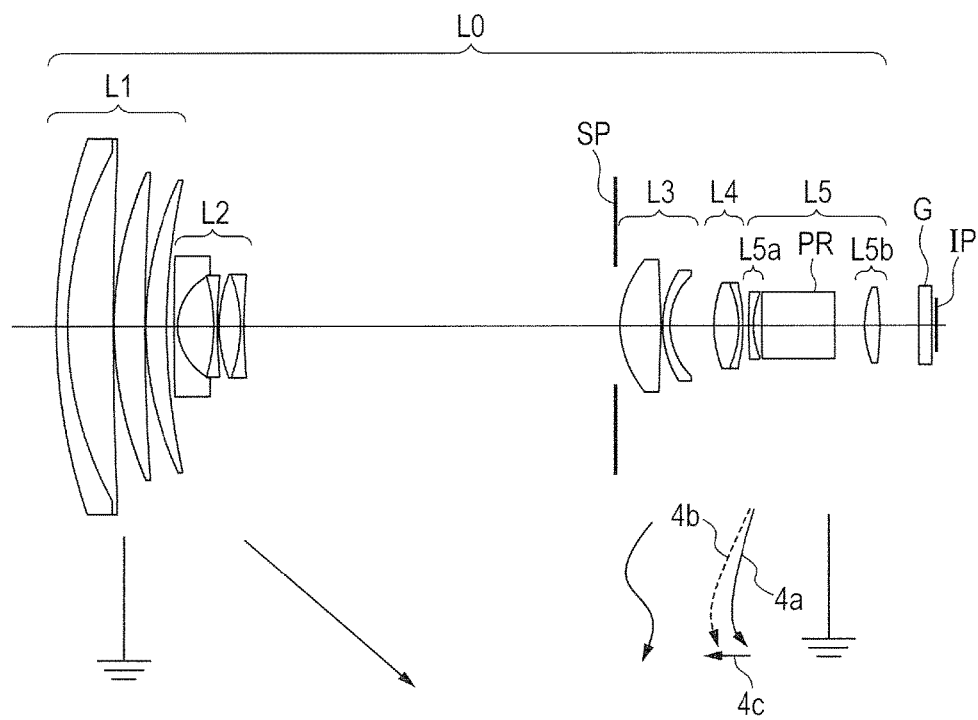
FIG. 9 is a lens sectional view of a zoom lens according to Embodiment 5 of the present invention at the wide angle end.
Figure 10A:
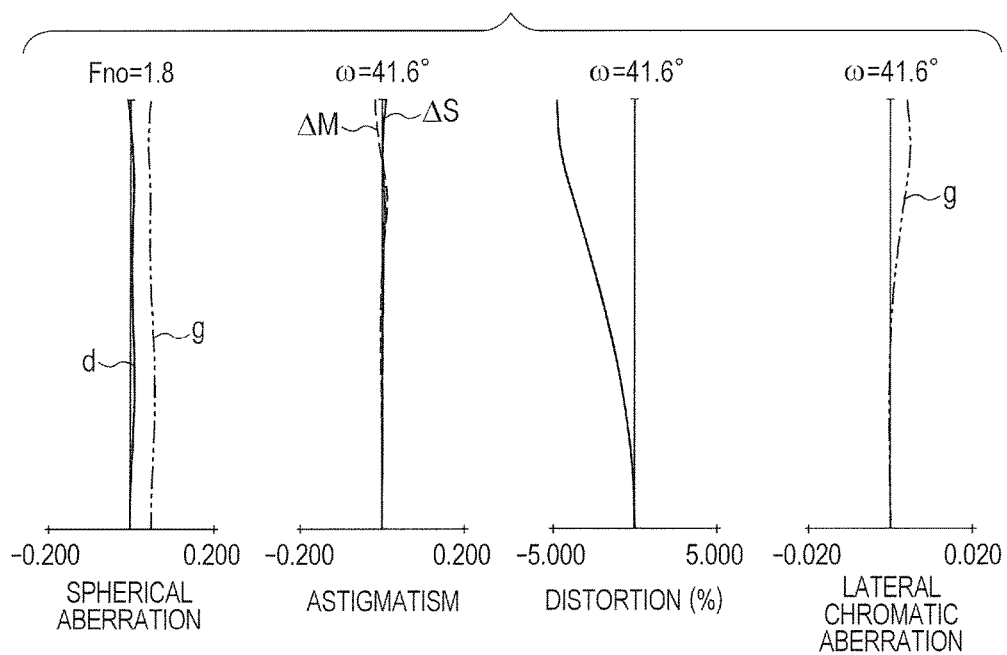
FIG. 10A is a diagram showing aberrations in the zoom lens according to Embodiment 5 of the present invention at the wide angle end.
Figure 10B:
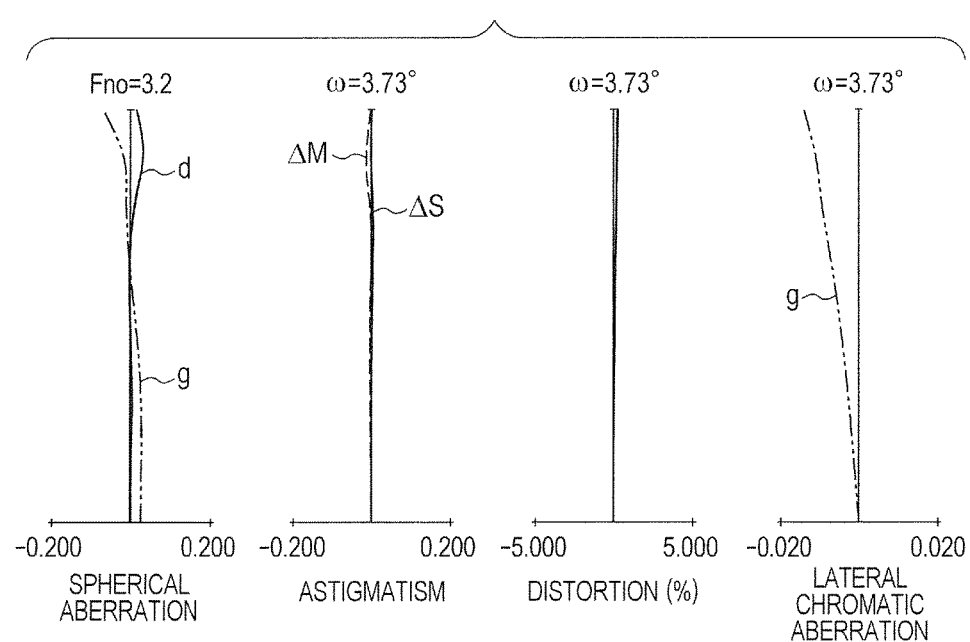
FIG. 10B is a diagram showing aberrations in the zoom lens according to Embodiment 5 of the present invention at the middle zoom position.
Figure 10C:
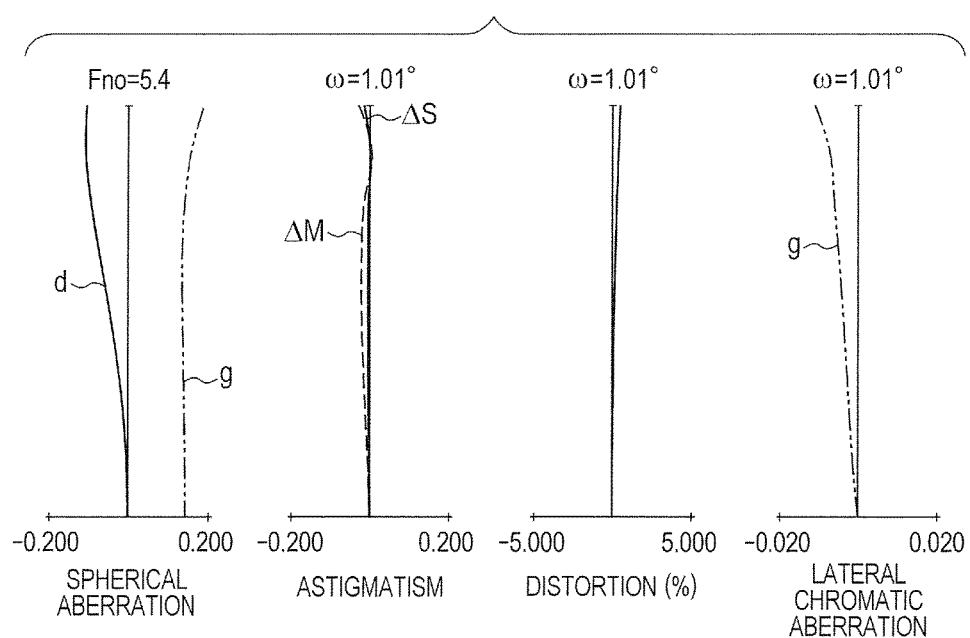
FIG. 10C is a diagram showing aberrations in the zoom lens according to Embodiment 5 of the present invention at the telephoto end.

FIG. 7 is a lens sectional view of a zoom lens according to Embodiment 4 of the present invention at the wide angle end. FIGS. 8A, 8B, and 8C are diagrams showing aberrations in the zoom lens according to Embodiment 4 at the wide angle end, the middle zoom position, and the telephoto end, respectively. The zoom lens of Embodiment 4 has a zoom ratio of 25.00 and an F-number of 1.60 to 2.50. FIG. 9 is a lens sectional view of a zoom lens according to Embodiment 5 of the present invention at the wide angle end. FIGS. 10A, 10B, and 10C are diagrams showing aberrations in the zoom lens according to Embodiment 5 at the wide angle end, the middle zoom position, and the telephoto end, respectively. The zoom lens of Embodiment 5 has a zoom ratio of 50.01 and an F-number of 1.80 to 5.40.

In Embodiments 1 to 3 and 5, an internal reflection prism PR is used as the reflector and bends the optical path 90° at an internal reflection surface provided within the prism. However, for convenience sake, the lens sectional views illustrate the prism as a glass block PR with the optical path being straightened. In Embodiment 4, a reflection mirror UR is used as the reflector and bends an optical path 90° at its reflection surface which is placed on the optical path at an angle of 45° with respect to the optical axis. However, for convenience sake, the lens sectional view illustrates the position of the reflection mirror with a dotted line UR with the optical path being straightened.

Figure 11:
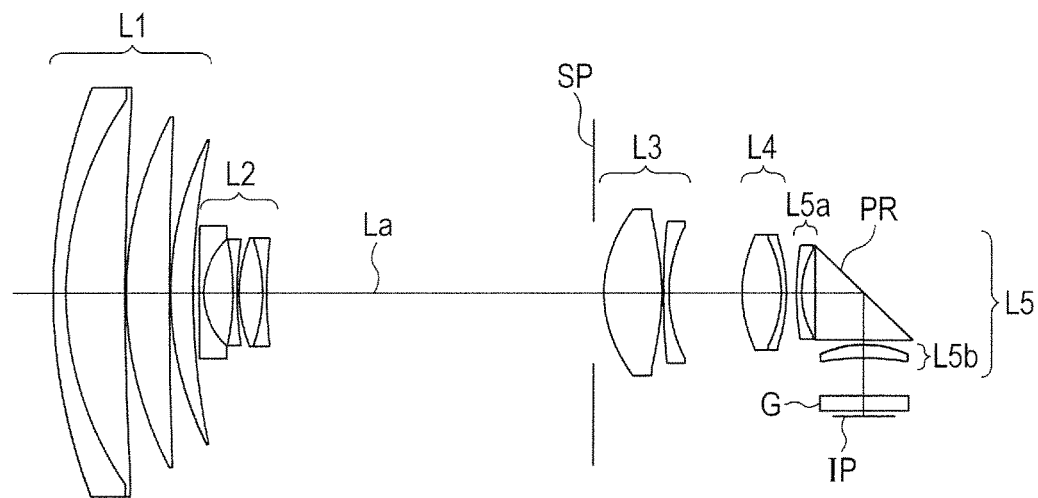
FIG. 11 is a lens sectional view of the zoom lens according to Embodiment 1 of the present invention at the wide angle end.
Figure 12:
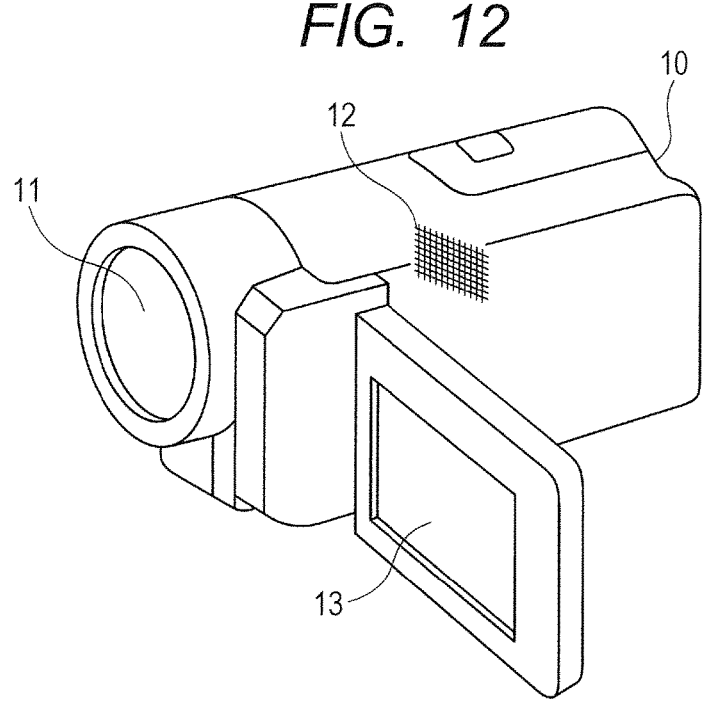
FIG. 12 is a schematic diagram showing a main part of an image pickup apparatus of the present invention.

FIG. 11 is a lens sectional view of the zoom lens according to Embodiment 1 of the present invention at the wide angle end. The lens sectional view in FIG. 11 illustrates the optical path bent 90° at the internal reflection surface of the reflector (prism). FIG. 12 is a diagram schematically showing a main part of a camera (an image pickup apparatus) including the zoom lens of the present invention. The zoom lens according to each embodiment is an imaging lens system for use in an image pickup apparatus (camera) such as a video camera, digital camera, or a silver-halide film camera.

In the lens sectional views, the left side is a subject (object) side (i.e., the front side), and the right side is an image side (i.e., the back side). In the lens sectional views, each lens unit is denoted by Li where "i" is the ordinal number of the lens unit from the object side. "SP" denotes an aperture stop that restricts F-number light. The reflector is denoted by "PR" when it is a prism that bends an optical path 90° or substantially 90° (e.g., ±10°), and by "UR" when it is a reflection mirror surface that bends an optical path 90° or substantially 90° (e.g., ±10°). "G" denotes an optical block such as an optical filter, a face plate, a quartz low-pass filter, or an infrared cut filter.

"IP" denotes an image plane. When the zoom lens is used as an image pickup optical system for a video camera or a digital still camera, the image pickup surface of a solid-state image pickup element (photoelectric conversion element), such as a CCD sensor or a CMOS sensor, is placed at the image plane IP. When the zoom lens is used as an image pickup optical system for a silver-halide film camera, a photosensitive surface, which is equivalent to a film plane, is placed at the image plane IP. In a part showing spherical aberration in each aberration diagram, a solid line "d" denotes d-line (wavelength 587.6 nm), and a two-dot chain line "g" denotes g-line (wavelength 435.8 nm). In a part showing astigmatism, a broken line "ΔM" denotes a meridional image plane for d-line, and a solid line ΔS denotes a sagittal image plane for d-line.

Lateral chromatic aberration is represented by g-line. "Fno" denotes an F-number, and "ω" denotes a half angle of view (half of an angle imaged) (degrees). In the following embodiments, the wide angle end and the telephoto end refer to mechanically available ends of the zoom range in which the lens units for zooming can move on an optical axis.

The zoom lens of the present invention includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5.

The fifth lens unit L5 includes, in order from the object side to the image side, a first lens subunit L5a having a negative refractive power, a reflector that bends an optical path, and a second lens subunit L5b having a positive refractive power. The zoom lens of the present invention employs a retrofocus configuration in which, at the wide angle end, the back focal length (in an optical length) is longer than a focal length fw of the enter system. In this configuration, the principal point of the fifth lens unit L5 is displaced largely toward the image side when the fifth lens unit L5 has a positive refractive power, and toward the object side when the fifth lens unit L5 has a negative refractive power, so as to increase a lateral magnification β5 of the fifth lens unit L5 and facilitate to have a long back focal length.

During zooming from the wide angle end to the telephoto end, at least the second lens unit L2 and the fourth lens unit L4 move as shown with the arrows: the second lens unit L2 moves toward the image side, and the fourth lens unit L4 moves non-linearly. Solid curve 4a and dotted curve 4b are the loci of the fourth lens unit L4 moving for correction of image plane variation caused by zooming, the fourth lens unit L4 moving along the solid curve 4a when focus is at infinity and along the dotted curve 4b when focus is at close-up. The fourth lens unit L4 moves on the optical axis for focusing. To focus from infinity to close-up at the telephoto end, the fourth lens unit L4 moves forward (to the object side) as shown with arrow 4c.

A positional sensitivity es4, which is the ratio of the amount of displacement of the position of the image plane to the amount of displacement of the fourth lens unit L4 in the optical axis direction, is expressed by the following formula (A) using a lateral magnification β4 of the fourth lens unit L4 and the lateral magnification β5 of the fifth lens unit L5.

$$es4 = (1-(\beta 4)^2) \times (\beta 5)^2 \qquad (A)$$

The larger the positional sensitivity es4, the less the fourth lens unit L4 has to move for zooming and focusing. Reduction in the overall lens length can thereby be facilitated.

In each embodiment, the fifth lens unit L5 includes, in order from the object side to the image side, the first lens subunit L5a having a negative refractive power and the second lens subunit L5b having a positive refractive power. This allows the fifth lens unit L5 to have the lateral magnification β5 of 1 or more, irrespective of the sign of its refractive power.

The larger an optical distance d5ab of the interval between the first lens subunit L5a and the second lens subunit L5b, the more the paraxial image plane of the fifth lens unit L5 shifts backward, allowing the lateral magnification β5 to be larger. Herein, when an optical member (such as a prism) is placed on the interval between the first lens subunit L5a and the second lens subunit L5b, the optical distance d5ab of the interval is calculated using the length of the optical member divided by the refractive index of its material. The refractive index of a material is defined as a refractive index for d-line. When there is no optical member on the interval, i.e., when there is only air on the interval, the optical distance equals the value of an air interval.

As described, the fifth lens unit L5 has the first lens subunit L5a having a negative refractive power and the second lens subunit L5b having a positive refractive power, and these subunits have a long optical distance d5ab of the interval therebetween to increase the positional sensitivity es4. The increase in the positional sensitivity es4 consequently decreases the overall lens length. Further, space between the first lens subunit L5a and the second lens subunit L5b having a long optical distance d5ab is effectively used by insertion of the reflector that bends an optical path 90° or substantially 90° (90°±10°). The insertion of the reflector enables reduction in the size of the zoom lens in the direction of the optical axis of incident light.

As the reflector, the prism PR having an internal reflection surface, the mirror UR, or the like is used. The second lens subunit L5b is placed on the image side of the reflector such that the optical axis extends in a direction perpendicular or substantially perpendicular to an optical axis La of light entering the zoom lens L0. In addition, the image pickup element is placed such that the normal to its image plane is perpendicular or substantially perpendicular to the optical axis La of incident light. These members have relatively small effective diameters, advantageously reducing the space in the zoom lens in the optical axis direction.

The optical path length in a direction perpendicular or substantially perpendicular to the optical axis La of light entering the zoom lens L0 is equal to the thickness of the second lens subunit L5b in the optical axis direction combined with the space in front of and behind the second lens subunit L5b, as shown in FIG. 11. No extensive space is therefore necessary after the reflector. In a zoom lens having five units, like the one of the present invention, the outer diameter of the lens barrel is often determined substantially by the diameter of the frontmost first lens unit L1 having the largest effective diameter, and protrusion of the lens barrel in a direction perpendicular to the optical axis La of light entering the zoom lens is easily kept small by the non-extensive space after the reflector.

Compared to a zoom lens without the reflector, the zoom lens of the present invention can easily achieve size reduction of the lens barrel including the entire lens system and retention members for retaining the lenses. As a result, enough room can be given for the zooming lens units to move during zooming, which facilitates to achieve a high zoom ratio. Moreover, the above configuration does not require unnecessary increase in the refractive power of each lens unit, which facilitates to achieve high optical performance with fewer lenses needed for aberration correction.

In each embodiment, at least the second lens unit L2 and the fourth lens unit L4 move for zooming to change the interval between the third lens unit L3 and the fourth lens unit L4 and the interval between the fourth lens unit L4 and the fifth lens unit L5 such that the interval between the first lens unit L1 and the second lens unit L2 at the telephoto end is larger than that at the wide angle end and the interval between the second lens unit L2 and the third lens unit L3 at the telephoto end is smaller than that at the wide angle end.

The fifth lens unit L5 does not move for zooming. Since the second lens subunit L5b, having a positive refractive power, of the fifth lens unit L5 is placed on the image plane side of the reflector, the telecentricity of light entering the image pickup plane is improved. A focal length f5a of the first lens subunit L5a and the optical distance d5ab of the interval between the first lens subunit L5a and the second lens subunit L5b satisfy the following conditional expression:

$$0.40 < -d5ab/f5a < 1.00 \quad (1)$$

The technical meaning of this conditional expression is described next. Conditional Expression (1) defines the ratio of the interval (optical distance) between the first lens subunit L5a and the second lens subunit L5b to the focal length of the first lens subunit L5a. As described above, the interval d5ab is related to the length of the focus stroke of the fourth lens unit L4 because the interval d5ab affects the lateral magnification of the fifth lens unit L5 and consequently the value of Formula (A). The larger the interval d5ab, the shorter the focus stroke can be.

If the interval d5ab is too long, making the ratio of Conditional Expression (1) exceed the upper limit defined therein, the exceeding part of the interval d5ab cancels out the effect of the reduction in the focus stroke of the fourth lens unit L4, increasing the overall lens length. In addition, if the negative refractive power of the first lens subunit L5a is too strong (or too large in absolute value), making the ratio of Conditional Expression (1) exceed the upper limit defined therein, off-axial aberrations, such as lateral chromatic aberration and astigmatism, occur too much.

It is then difficult for the second lens subunit L5b to correct such aberrations. Furthermore, the first lens subunit L5a with such a strong refractive power diverges off-axial rays passing therethrough too much, requiring the reflector and the second lens subunit L5b to have larger effective diameters and thus hindering size reduction of the entire system.

Conversely, if the interval d5ab is too short, making the ratio of Conditional Expression (1) fall below the lower limit defined therein, the length of the focus stroke of the fourth lens unit L4 increases too much and exceeds the amount by which the interval d5ab is reduced, which consequently increases the overall lens length. In addition, if the negative refractive power of the first lens subunit L5a is too weak (or too small in absolute value), making the ratio of Conditional Expression (1) fall below the lower limit defined therein, it is difficult to have a back focal length of a predetermined length.

Preferably, numbers in Conditional Expression (1) may be set as follows:

$$0.44 < -d5ab/f5a < 0.90 \quad (1a)$$

More preferably, numbers in Conditional Expression (1a) may be set as follows to ensure the advantageous effects described above.

$$0.48 < -d5ab/f5a < 0.80 \quad (1b)$$

The zoom lens of the present invention configured as above is compact as a whole, has a high zoom ratio, and offers high optical performance.

It is still more preferable that each embodiment satisfies at least one of the following conditional expressions.

$$7.0 < -f1/f2 < 10.0 \quad (2)$$

$$-2.0 < (R5ar+R5af)/(R5ar-R5af) < -0.9 \quad (3)$$

$$0.3 < |f5a/f5b| < 1.2 \quad (4)$$

$$1.30 < \beta5 < 2.00 \quad (5)$$

$$0.22 < d5i/d15w < 0.40 \quad (6)$$

$$65.0 < vd1p < 90.0 \quad (7)$$

$$13.0 < \beta2t/\beta2w < 60.0 \quad (8)$$

$$1.90 < nd2a < 2.10 \quad (9)$$

$$4.8 < f3/fw < 8.0 \quad (10)$$

$$0.04 < f4/ft < 0.18 \quad (11)$$

In the above conditional expressions, "f1" represents the focal length of the first lens unit L1, and "f2" represents the focal length of the second lens unit L2. "R5af" and "R5ar" represent the radiuses of curvature of the object-side lens surface and the image-side lens surface, respectively, of a negative lens G5an which solely constitutes the first lens subunit L5a. "f5b" represents the focal length of the second lens subunit L5b. "β5" represents the lateral magnification of the fifth lens unit L5.

"d5i" is a sum of a distance of the back focal length in air and the distance, on the optical axis, from a lens surface of the fifth lens unit L5 closest to an object to a lens surface of the fifth lens unit L5 closest to an image. "d15w" is the distance, at the wide angle end, from a lens surface of the first lens unit L1 closest to an object to the lens surface of the fifth lens unit L5 closest to an image.

"vd1p" represents an average Abbe number for d-line of the materials of multiple positive lenses constituting the first lens unit L1. "β2w" and "β2t" represent the lateral magnification of the second lens unit L2 at the wide angle end and the telephoto end, respectively. "nd2a" represents an average refractive index for d-line of the materials of multiple lenses constituting the second lens unit L2. "f3" represents the focal length of the third lens unit L3, and "fw" represents the focal length of the entire system at the wide angle end. "f4" represents the focal length of the fourth lens unit L4, and "ft" represents the focal length of the entire system at the telephoto end.

Next, the technical meanings of the above conditional expressions are described. Conditional Expression (2) defines the ratio of the focal length (refractive power) of the first lens unit L1 to the focal length of the second lens unit L2. If the second lens unit L2, which is most responsible for zooming, has a focal length too much shorter (or a negative refractive power too much stronger) than the first lens unit L1, making the ratio of Conditional Expression (2) exceed the upper limit defined therein, off-axial aberrations, such as lateral chromatic aberration and astigmatism, vary too much in zooming, which makes it difficult to offer high optical performance over the entire zoom range.

Conversely, if the first lens unit L1 has a focal length too much shorter (or a positive refractive power too much stronger) than the second lens unit L2, making the ratio of Conditional Expression (2) fall below the lower limit defined therein, it is difficult to correct axial chromatic aberration at the telephoto end where such aberration tends to be problematic in a zoom lens with a high zoom ratio. Conditional Expression (3) defines the shape of the negative lens G5an forming the first lens subunit L5a. When the ratio of Conditional Expression (3) is in the range from 0 to −1.0, the negative lens G5an is biconcave with its image-side lens surface having a large curvature (the inverse of the radius of curvature). When the ratio of Conditional Expression (3) is −1.0, the negative lens G5an is planoconcave with its object-side lens surface being flat. When the ratio of Conditional Expression (3) is less than −1.0, the negative lens G5an is a meniscus lens having a convex surface facing to the object side.

If the curvature of the object-side concave surface is too large, making the ratio of Conditional Expression (3) exceed the upper limit defined therein, axial rays converged by passing through the third lens unit L3 having a positive refractive power and through the fourth lens unit L4 having a positive refractive power enter the first lens subunit L5a at a large incident angle. As a result, the first lens subunit L5a causes large spherical aberration. Such spherical aberration cannot be corrected by the second lens subunit L5b sufficiently, making it difficult to offer high optical performance.

Conversely, if the curvatures of the object-side convex surface and the image-side concave surface of the meniscus lens are too large, making the ratio of Conditional Expression (3) fall below the lower limit defined therein, too much space is necessary on the optical axis to place the first lens subunit L5a, which hinders size reduction of the entire system. Moreover, off-axial rays diverged by passing through the image-side lens surface of the first lens subunit L5a are emitted at angles so large that the first lens subunit L5a causes large off-axial aberrations, such as lateral chromatic aberration and astigmatism. Then, it is difficult for the second lens subunit L5b to correct such aberrations, making it difficult to offer high optical performance.

Conditional Expression (4) defines the ratio of the focal length of the first lens subunit L5a to the focal length of the second lens subunit L5b. If the second lens subunit L5b has a focal length too much smaller (or a refractive power too much stronger) in absolute value than the first lens subunit L5a, making the ratio of Conditional Expression (4) exceed the upper limit defined therein, the second lens subunit L5b causes large lateral chromatic aberration and astigmatism due to off-axial rays passing through the second lens subunit L5b at high positions. It is then difficult for another lens unit to correct such aberrations.

Conversely, if the first lens subunit L5a has a focal length too much smaller (or a refractive power too much stronger) in absolute value than the second lens subunit L5b, making the ratio of Conditional Expression (4) fall below the lower limit defined therein, the first lens subunit L5a diverges off-axial rays too strongly. Consequently, the reflector and the second lens subunit L5b need large effective diameters to allow the off-axial rays having passed through and been diverged by the first lens subunit L5a to pass therethrough without vignetting. Such increase in the effective diameters hinders size reduction of the entire lens system.

Conditional Expression (5) defines the lateral magnification of the fifth lens unit L5. If the lateral magnification of the fifth lens unit L5 is too large, exceeding the upper limit defined in Conditional Expression (5), the interval between the first lens subunit L5a and the second lens subunit L5b increases too much, which in turn increases the size of the lens system. Conversely, if the lateral magnification of the fifth lens unit L5 is too small, falling below the lower limit defined in Conditional Expression (5), the positional sensitivity es4, which is the ratio of the amount of displacement of the position of the image plane to the amount of displacement of the fourth lens unit L4 in the optical axis direction and is obtained using Formula (A), becomes too small. As a result, the interval between the fourth lens unit L4 and the fifth lens unit L5 has to be extended to create space necessary for the focus stroke of the fourth lens unit L4. This consequently increases the overall lens length.

Conditional Expression (6) defines the ratio of the distance from the image plane to a reference surface which is the lens surface of the fifth lens unit L5 closest to an object, to the distance from the reference surface to the lens surface of the first lens unit L1 closest to an object. If the distance from the image plane to the lens surface of the fifth lens unit L5 closest to the object side is too long, making the ratio of Conditional Expression (6) exceed the upper limit defined therein, the optical path after being bent by the reflector in a direction perpendicular to the optical axis of incident light increases too much in length, causing size increase of the lens system.

Conversely, if the distance from the lens surface of the fifth lens unit L5 closest to an object to the lens surface of the first lens unit L1 closest to an object is too long, making the ratio of Conditional Expression (6) fall below the lower limit defined therein, such a configuration facilitates to achieve a high zoom ratio, but increases the lens length in the direction of the optical axis of incident light too much, hindering reduction of the overall lens length.

Conditional Expression (7) defines an average Abbe number of materials of all the positive lenses in the first lens unit L1. If the average Abbe number vd1p for d-line of the materials of the positive lenses in the first lens unit L1 is too large, exceeding the upper limit defined in Conditional Expression (7), it is easy to correct axial chromatic aberration at the telephoto end, but the refractive index is too small for a typical optical material.

As a result, the lens surfaces of the positive lenses need to have large curvatures, which makes it difficult to correct spherical aberration at the telephoto end, increases the lens thicknesses, increases the overall lens length, and increases the effective diameter of the frontmost lens. Conversely, if the average Abbe number dip is too small, falling below the lower limit defined in Conditional Expression (7), the materials of the positive lenses cause too much dispersion, making it difficult to correct axial chromatic aberration at the telephoto end.

Conditional Expression (8) defines the magnification ratio of the second lens unit L2. If the magnification ratio of the second lens unit L2 is too large, exceeding the upper limit defined in Conditional Expression (8), the length of the zoom stroke of the second lens unit L2 increases, which in turn increases the overall lens length. Conversely, if the magnification ratio of the second lens unit L2 is too small, falling below the lower limit defined in Conditional Expression (8), it is difficult to achieve a high zoom ratio.

Conditional Expression (9) defines an average refractive index of materials of the lenses constituting the second lens unit L2. If the average refractive index of the lenses constituting the second lens unit L2 is too large, exceeding the upper limit defined in Conditional Expression (9), negative Petzval sum becomes too small for the second lens unit L2 having a strong negative refractive power. Then, the Petzval sum for the entire lens system increases toward the positive excessively.

As a result, large negative field curvature occurs to decrease the optical performance for the periphery of the screen over the entire zoom range. Conversely, if the average refractive index is too small, falling below the lower limit defined in Conditional Expression (9), the negative lenses constituting the second lens unit L2 need to have excessively small radiuses of curvature because the second lens unit L2 is most responsible for zooming and therefore needs a strong negative refractive power. The second lens unit L2 having such large curvature generates large field curvature and astigmatism, and these aberrations vary greatly in zooming.

Conditional Expression (10) defines the positive refractive power of the third lens unit L3. If the focal length of the third lens unit L3 is too long (or the positive refractive power of the third lens unit L3 is too weak), making the ratio of Conditional Expression (10) exceed the upper limit defined therein, the third lens unit L3 cannot sufficiently converge rays that have passed through and been diverged by the second lens unit L2 having a strong negative refractive power. This requires excessive increase in the effective diameters of the fourth lens unit L4 and the fifth lens unit L5, which are placed on the image side of the third lens unit L3, and consequently hinders size reduction of the entire lens system.

Conversely, if the focal length of the third lens unit L3 is too short (or the positive refractive power of the third lens unit L3 is too strong), making the ratio of Conditional Expression (10) fall below the lower limit defined therein, the third lens unit L3 causes aberrations, such as axial chromatic aberration, spherical aberration, and astigmatism, so much that it is difficult to correct them.

Conditional Expression (11) defines the positive refractive power of the fourth lens unit L4. If the focal length of the fourth lens unit L4 is too long (or the positive refractive power of the fourth lens unit L4 is too weak), making the ratio of Conditional Expression (11) exceed the upper limit defined therein, the lateral magnification β4 of the fourth lens unit L4 decreases, which causes excessive reduction in the positional sensitivity es4, which is the ratio of the amount of displacement of the position of the image plane to the amount of displacement of the fourth lens unit L4 in the optical axis direction and is obtained using Formula (A). The small positional sensitivity es4 consequently requires the fourth lens unit L4 to move longer for focusing and zooming, hindering size reduction of the entire lens system.

Conversely, if the focal length of the fourth lens unit L4 is too short (or the positive refractive power of the fourth lens unit L4 is too strong), making the ratio of Conditional Expression (11) fall below the lower limit defined therein, the fourth lens unit L4 causes large aberrations such as lateral chromatic aberration, field curvature, and astigmatism. Then, these aberrations vary so much in focusing that it is difficult to maintain high optical performance.

More preferably, the numbers in Conditional Expressions (2) to (11) may be set as follows.

$$7.2 < -f1/f2 < 9.2 \tag{2a}$$

$$-1.9 < (R5ar+R5af)/(R5ar-R5af) < -1.0 \tag{3a}$$

$$0.4 < |f5a/f5b| < 1.1 \tag{4a}$$

$$1.35 < \beta5 < 1.80 \tag{5a}$$

$$0.24 < d5i/d15w < 0.35 \tag{6a}$$

$$66.0 < vd1p < 85.0 \tag{7a}$$

$$15.0 < \beta2t/\beta2w < 55.0 \tag{8a}$$

$$1.93 < nd2a < 2.05 \tag{9a}$$

$$5.0 < f3/fw < 7.5 \tag{10a}$$

$$0.06 < f4/ft < 0.16 \tag{11a}$$

Still more preferably, numbers in Conditional Expressions (2a) to (11a) may be set as follows to ensure the advantageous effects to be achieved by these conditional expressions.

$$7.3 < -f1/f2 < 8.8 \tag{2b}$$

$$-1.85 < (R5ar+R5af)/(R5ar-R5af) < -1.10 \tag{3b}$$

$$0.5 < |f5a/f5b| < 1.0 \tag{4b}$$

$$1.40 < \beta5 < 1.70 \tag{5b}$$

$$0.25 < d5i/d15w < 0.30 \tag{6b}$$

$$67.0 < vd1p < 82.0 \tag{7b}$$

$$16.0 < \beta2t/\beta2w < 50.0 \tag{8b}$$

$$1.95 < nd2a < 2.00 \tag{9b}$$

$$5.2 < f3/fw < 7.0 \tag{10b}$$

$$0.08 < f4/ft < 0.15 \tag{11b}$$

In each embodiment, the second lens subunit L5b preferably consists of a single positive lens component. Here, a lens component refers to a lens formed by a single lens, as well as a cemented lens formed by joining at least one positive lens and at least one negative lens. Such a configuration of the second lens subunit L5b facilitates size and weight reduction of the entire lens unit.

Preferably, the third lens unit L3 includes at least one positive lens and at least one negative lens. This configuration facilitates correction of chromatic aberration in the third lens unit L3 and attainment of high optical performance with a high zoom ratio. In addition, the second lens unit L2 preferably includes at least three negative lenses and at least one positive lens. This configuration facilitates favorable correction of aberrations such as lateral chromatic aberration, field curvature, and astigmatism, allowing reduction in variation in these aberrations in zooming.

When configured to meet the conditional expressions given above, the zoom lens of each embodiment can easily offer high optical performance with a compact lens system and a high zoom ratio.

In Embodiments 1 to 3, the first lens unit L1 and the third lens unit L3 do not move for zooming, and during zooming from the wide angle end to the telephoto end, the second lens unit L2 moves toward the image side, and the fourth lens unit L4 moves along a locus convex to the object side. In other words, during zooming from the wide angle end to the telephoto end, the fourth lens unit L4 moves toward the object side and then toward the image side. In Embodiment 4, the third lens unit L3 does not move for zooming, and during zooming from the wide angle end to the telephoto end, the first lens unit L1 moves toward the object side, the second lens unit L2 moves toward the image side, and the fourth lens unit moves along a locus convex to the object side. In other words, during zooming from the wide angle end to the telephoto end, the fourth lens unit L4 moves toward the object side and then toward the image side.

In Embodiment 5, the first lens unit L1 does not move for zooming, whereas the third lens unit L3 moves during zooming. During zooming from the wide angle end to the telephoto end, the second lens unit L2 moves toward the image side, and the fourth lens unit L4 moves along a locus convex to the object side. In other words, during zooming from the wide angle end to the telephoto end, the fourth lens unit L4 moves toward the object side and then toward the image side.

Next, a specific configuration of the zoom lens of each embodiment is described. Unless otherwise specified, the lenses are arranged in order from the object side to the image side. In Embodiment 1, during zooming from the wide angle end to the telephoto end, the second lens unit L2 moves toward the image side to perform zooming, and the fourth lens unit L4 moves to perform focusing and correction of image plane variation caused by the zooming. The first lens unit L1 does not move for zooming. This configuration of the first lens unit L1 not moving for zooming simplifies the zooming mechanism.

The third lens unit L3 does not move for zooming. This configuration of the third lens unit L3 not moving for zooming simplifies the zooming mechanism. The fifth lens unit L5 does not move for zooming. The aperture stop SP is placed on the object side of the third lens unit L3. The aperture stop SP does not move for zooming. The aperture diameter of the aperture stop SP is variable during zooming, so that unwanted flare light may be blocked in a range from the middle zoom position to the telephoto end to maintain favorable optical performance for a high zoom ratio.

Embodiment 2 has the same zooming mechanism and focusing mechanism as Embodiment 1. The moving conditional expression for the aperture stop SP for zooming is the same as that in Embodiment 1. Embodiment 3 has the same zooming mechanism and focusing mechanism as Embodiment 1. The moving condition for the aperture stop SP for zooming is the same as that in Embodiment 1.

Embodiment 4 differs from Embodiment 1 in that the first lens unit L1 moves during zooming in such a manner as to be located closer to the object side at the telephoto end than at the wide angle end. The moving conditions for the other lens units for zooming and focusing are the same as those in Embodiment 1. The moving condition for the aperture stop SP for zooming is the same as that in Embodiment 1.

In Embodiment 4, the first lens unit L1 moves during zooming to shorten the length of the zoom stroke of the second lens unit L2 necessary to obtain a sufficient zoom ratio and to thereby facilitate reduction in the overall lens length at the wide angle end. As a result, the frontmost lens (i.e., the first lens unit L1) and the second lens unit L2, the effective diameters of which are determined by rays at the wide angle end, can be reduced in diameter to facilitate size reduction of the entire lens system.

Embodiment 5 differs from Embodiment 1 in that the third lens unit L3 moves for zooming. Moving conditions for the other lens units for zooming and focusing are the same as those in Embodiment 1. The aperture stop SP moves integrally with the third lens unit L3 (along the same locus) for zooming. In Embodiment 5, the configuration of the third lens unit L3 moving for zooming increases the number of degrees of freedom for aberration correction so that variation in aberrations caused by zooming, such as chromatic aberration, field curvature, and astigmatism, may be favorably corrected. The above-described configuration of the third lens unit L3 also facilitates to create space for the focus stroke of the fourth lens unit L4.

The aperture stop SP may alternatively move independently of the third lens unit L3 (along a different locus) for zooming. This configuration enables reduction in the diameter of the stop as well as favorable blocking of off-axial flare light at the middle zoom position.

Next, the configurations of the lens units in each embodiment are described. In Embodiment 1, the first lens unit L1 includes, in order from the object side to the image side, a cemented lens formed by joining a negative meniscus lens having a convex surface facing to the object side and a positive lens having a convex surface facing to the object side and two positive meniscus lenses each having a convex surface facing to the object side. This configuration of the first lens unit L1 including one negative lens and three positive lenses enables favorable correction of aberrations, such as spherical aberration, axial chromatic aberration, and lateral chromatic aberration, that increase at the telephoto end when a high zoom ratio is attempted.

The second lens unit L2 includes, in order from the object side to the image side, a negative lens having a concave surface facing to the image side, a negative biconcave lens component, and a cemented lens being formed by joining a positive biconvex lens and a negative lens and having a positive refractive power as a whole. In Embodiment 1, the negative biconcave lens component consists of a single negative lens. This configuration of the negative lens component consisting of a single negative lens achieves weight reduction. The third lens unit L3 includes, in order from the object side to the image side, a positive biconvex lens having an aspherical surface and a negative meniscus lens having a convex surface facing to the object side. This configuration of the third lens unit L3 including two lenses achieves reduction in the overall lens length.

The fourth lens unit L4 includes a cemented lens being formed by a positive biconvex lens and a negative meniscus lens having a convex surface facing to the image side and having a positive refractive power as a whole. This configuration of the fourth lens unit L4 reduces variation in aberrations caused by zooming and focusing, such as chromatic aberration, field curvature, and astigmatism. In addition, the configuration of the fourth lens unit L4 consisting of a single lens component formed by cementing a positive lens and a negative lens together achieves assemblability and thickness reduction of the fourth lens unit L4, facilitating size reduction of the entire system. Moreover, since the lens surface of the fourth lens unit L4 closest to an object is aspherical, variation in field curvature and astigmatism caused by zooming and focusing is reduced.

The fifth lens unit L5 includes, in order from the object side to the image side, the first lens subunit L5a having a negative refractive power, the reflector that bends an optical path, and the second lens subunit L5b having a positive refractive power. The first lens subunit L5a consists of a negative meniscus lens having a convex surface facing to the object side. The second lens subunit L5b consists of a single positive lens. The reflector that bends an optical path is formed by a prism having an internal reflection surface. The light incident surface and the light emission surface of the prism may be formed as spherical or aspherical surfaces having refractive powers. Such a configuration increases the number of degrees of freedom for aberration correction.

In Embodiment 2, the first lens unit L1, the second lens unit L2, the fourth lens unit L4, and the fifth lens unit L5 have the same lens configurations as those of Embodiment 1. In Embodiment 2, the third lens unit L3 includes, in order from the object side to the image side, a positive biconvex lens having an aspherical surface, a negative meniscus lens having a convex surface facing to the object side, and a positive lens having a convex surface facing to the image side. Such a three-lens configuration of the third lens unit L3 facilitates to correct spherical aberration and field curvature favorably and therefore to offer high optical performance over the entire zoom range with a high zoom ratio.

In Embodiment 3, the first lens unit L1, the third lens unit L3, the fourth lens unit L4, and the fifth lens unit L5 have the same lens configurations as those of Embodiment 1. In Embodiment 3, the second lens unit L2 includes, in order from the object side to the image side, a negative lens having a concave surface facing to the image side, a negative biconcave lens component, and a cemented lens being formed by joining a positive biconvex lens and a negative lens and having a positive refractive power as a whole.

In Embodiment 3, the negative biconcave lens component in the second lens unit L2 is a cemented lens formed by joining a positive meniscus lens having a concave surface facing to the object side and a negative lens having a concave surface facing to the object side. This configuration of the negative lens component formed by a cemented lens increases the number of degrees of freedom for correction of chromatic aberration and facilitates reduction in variation in lateral chromatic aberration in zooming.

In Embodiment 4, the first lens unit L1, the third lens unit L3, and the fourth lens unit L4 have the same lens configurations as those of Embodiment 1. In Embodiment 4, the second lens unit L2 includes, in order from the object side to the image side, a negative lens having a concave surface facing to the image side, a negative biconcave lens component, and a cemented lens being formed by joining a positive biconvex lens and a negative lens and having a positive refractive power as a whole.

In Embodiment 4, the negative biconcave lens component in the second lens unit L2 is a cemented lens formed by joining a positive meniscus lens having a concave surface facing to the object side and a negative lens having a concave surface facing to the object side. This configuration of the negative lens component formed by a cemented lens increases the number of degrees of freedom for correction of chromatic aberration and facilitates reduction in variation in lateral chromatic aberration in zooming.

In Embodiment 4, the first lens subunit L5a has the same lens configuration as that of Embodiment 1, but the second lens subunit L5b is a cemented lens being formed by joining a negative lens and a positive lens and having a positive refractive power as a whole. Forming the second lens subunit L5b with a cemented lens reduces variation in lateral chromatic aberration in zooming. In addition, one of the lens surfaces is made aspherical in Embodiment 4 to effectively correct variation in field curvature and astigmatism in zooming.

In Embodiment 5, the first lens unit L1, the second lens unit L2, the third lens unit L3, the fourth lens unit L4, and the fifth lens unit L5 have the same lens configuration as those of Embodiment 1. In Embodiment 5, at least one lens surface of the second lens unit L2 is aspherical, so as to favorably correct variation in field curvature and astigmatism caused by zooming.

Preferred embodiments of the present invention have been given above. However, the present invention is not limited to those embodiments, and can be modified and changed variously without departing from the gist thereof.

Next, an embodiment of a video camera (an image pickup apparatus) using the zoom lens of the present invention is described using FIG. 12.

In FIG. 12, "10" denotes a video camera body, "11" denotes an image pickup optical system formed by the zooming lens of any of Embodiments 1 to 5, "12" denotes a solid-state image pickup element (a photoelectric conversion element), such as CCD sensor or a CMOS sensor, incorporated in the camera body 10 and configured to receive a subject image formed by the image pickup optical system 11, and "13" denotes a monitor formed by a liquid crystal panel or the like used for observation of the subject image photoelectrically converted by the solid-state image pickup element 12. An image pickup apparatus, such as a video camera, which is small and offers high optical performance can be achieved when the zoom lens of the present invention is applied to the image pickup apparatus.

In Embodiments 3 to 5, large negative distortion is caused near the wide angle end, so that the image pickup element has a smaller image pickup range at the wide angle end than at the other zoom positions. In other words, the zoom lenses of Embodiments 3 to 5 have a smaller effective image diameter (image height) at or near the wide angle end than at the other zoom positions (the telephoto end). When the zoom lens of any of Embodiments 3 to 5 is used in an image pickup apparatus, a signal processing circuit that processes image data obtained by an image pickup element may be employed to electrically correct distortion in image information obtained by the image pickup apparatus, so that an output image may contain less distortion.

When configured as described above, the zoom lens of each embodiment can have a compact optical system, have a high zoom ratio, and offer high optical performance over the entire zoom range. In addition, by including the reflector between the first lens subunit L5a and the second lens subunit L5b to bend light from the object side as shown in FIG. 11, the zoom lens of each embodiment facilitates reduction in the size of the camera in its thickness direction.

Next, Numerical Data 1 to 5 corresponding respectively to Embodiments 1 to 5 of the present invention are demonstrated. In each numerical data, "i" represents the ordinal number of an optical surface from the object side, "ri" represents the radius of curvature of the i-th optical surface (or simply the i-th surface), "di" represents the interval between the i-th surface and the (i+1)th surface, and ndi and vdi respectively represent the refractive index and the Abbe number, for d-line, of a material of an optical member between the i-th surface and (i+1)th surface.

In addition, with "k" representing an eccentricity, "A4", "A6", "A8", "A10" representing aspherical coefficients, and "x" representing a displacement from the surface vertex along the optical axis at a height h from the optical axis, an aspherical shape is expressed as follows:

$$x=(h^2/R)/[1+[1-(1+k)(h/R)^2]^{1/2}]+A4h^4+A6h^6+A8h^8+A10h^{10}$$

where R represents the paraxial radius of curvature.

For example, "E-Z" indicates "$10^{-Z}$". In addition, r25 and r26 in Numerical Data 1, r27 and r28 in Numerical Data 2, r26 and r27 in Numerical Data 3, and r25 and r26 in Numerical Data 5 are an incident surface and an emission surface of the reflector, respectively. In Numerical Data 1 to 5, the last two surfaces are the surfaces of an optical block such as a filter or a face plate.

In each embodiment, a back focal length (BF) represents the distance in air from the rearmost lens surface to a paraxial image plane. The overall lens length is a total distance of the back focal length BF and a distance from the surface of the lens closest to an object to the rearmost lens surface. Table 1 shows correspondences between Conditional Expressions (1) to (11) and Numerical Data 1 to 5.

[Numerical Data 1]

| [unit: mm] | | | | |
|---|---|---|---|---|
| Surface Data | | | | |
| Surface No. i | ri | di | ndi | vdi |
| 1 | 55.601 | 1.25 | 1.90366 | 31.3 |
| 2 | 33.475 | 5.76 | 1.49700 | 81.5 |
| 3 | 297.575 | 0.10 | | |
| 4 | 36.751 | 4.23 | 1.49700 | 81.5 |
| 5 | 449.604 | 0.10 | | |
| 6 | 33.071 | 2.20 | 1.49700 | 81.5 |
| 7 | 72.074 | (Variable) | | |
| 8 | 354.226 | 0.45 | 2.00100 | 29.1 |
| 9 | 7.094 | 2.92 | | |
| 10 | −25.844 | 0.40 | 2.00100 | 29.1 |
| 11 | 35.664 | 0.20 | | |

-continued

[unit: mm]

| | | | | |
|---|---|---|---|---|
| 12 | 14.224 | 2.28 | 1.95906 | 17.5 |
| 13 | −15.873 | 0.40 | 1.95375 | 32.3 |
| 14 | 46.312 | (Variable) | | |
| 15(Stop) | ∞ | 1.00 | | |
| 16* | 11.886 | 5.67 | 1.69350 | 53.2 |
| 17* | −22.240 | 0.16 | | |
| 18 | 66.126 | 0.55 | 1.95375 | 32.3 |
| 19 | 14.198 | (Variable) | | |
| 20* | 11.931 | 3.84 | 1.58313 | 59.4 |
| 21 | −11.305 | 0.50 | 1.92286 | 18.9 |
| 22 | −16.898 | (Variable) | | |
| 23 | 29.226 | 0.50 | 1.88300 | 40.8 |
| 24 | 8.500 | 1.37 | | |
| 25 | ∞ | 9.50 | 1.90366 | 31.3 |
| 26 | ∞ | 0.40 | | |
| 27 | 10.165 | 1.32 | 1.58313 | 59.4 |
| 28 | 28.185 | 3.80 | | |
| 29 | ∞ | 1.45 | 1.51633 | 64.1 |
| 30 | ∞ | 0.50 | | |
| Image Plane | ∞ | | | |

Aspheric Surface Data

16th Surface k = −5.92505e−001
A4 = −2.62511e−005
A6 = 1.63395e−007
A8 = −1.05446e−009

17th Surface k = −4.09575e+000
A4 = 8.04077e−005
A6 = −2.94823e−007

20th Surface k = −2.21757e+000
A4 = 5.45268e−005
A6 = −1.17004e−006

Various Data
Zoom Ratio 29.38

| | Wide Angle | Middle | Telephoto |
|---|---|---|---|
| Focal Length | 4.39 | 44.42 | 129.02 |
| F-NUMBER | 1.65 | 2.74 | 4.70 |
| Half Angle of View (degs.) | 34.34 | 3.86 | 1.33 |
| Image Height | 3.00 | 3.00 | 3.00 |
| Lens Total Length | 91.09 | 91.09 | 91.09 |
| BF | 5.25 | 5.25 | 5.25 |
| d7 | 0.60 | 25.98 | 31.55 |
| d14 | 31.95 | 6.57 | 1.00 |
| d19 | 7.15 | 2.30 | 7.59 |
| d22 | 1.03 | 5.88 | 0.60 |

| Unit | Start Surface | Focal Length |
|---|---|---|
| Zooming lens unit Data | | |
| 1 | 1 | 44.32 |
| 2 | 8 | −6.01 |
| 3 | 15 | 23.00 |
| 4 | 20 | 14.24 |
| 5 | 23 | −55.00 |
| Fifth lens unit Data | | |
| 5a | 23 | −13.73 |
| 5b | 27 | 26.55 |

[Numerical Data 2]

[unit: mm]

Surface Data

| Surface No. i | ri | di | ndi | νdi |
|---|---|---|---|---|
| 1 | 57.514 | 1.25 | 1.85478 | 24.8 |
| 2 | 36.014 | 5.32 | 1.49700 | 81.5 |
| 3 | 582.599 | 0.10 | | |
| 4 | 39.626 | 3.39 | 1.49700 | 81.5 |
| 5 | 165.433 | 0.10 | | |
| 6 | 30.150 | 3.03 | 1.59522 | 67.7 |
| 7 | 73.113 | (Variable) | | |
| 8 | 84.826 | 0.45 | 2.00100 | 29.1 |
| 9 | 6.148 | 3.07 | | |
| 10 | −19.284 | 0.40 | 1.95375 | 32.3 |
| 11 | 62.910 | 0.19 | | |
| 12 | 12.659 | 2.69 | 1.95906 | 17.5 |
| 13 | −13.790 | 0.40 | 2.00100 | 29.1 |
| 14 | 30.488 | (Variable) | | |
| 15(Stop) | ∞ | 1.00 | | |
| 16* | 11.410 | 4.42 | 1.85135 | 40.1 |
| 17* | −119.010 | 0.20 | | |
| 18 | 43.557 | 0.80 | 2.00100 | 29.1 |
| 19 | 10.352 | 1.98 | | |
| 20 | 89.298 | 1.98 | 1.49700 | 81.5 |
| 21 | −25.767 | (Variable) | | |
| 22* | 11.347 | 3.38 | 1.55332 | 71.7 |
| 23 | −12.686 | 0.50 | 1.94595 | 18.0 |
| 24 | −17.298 | (Variable) | | |
| 25 | 117.959 | 0.50 | 1.88300 | 40.8 |
| 26 | 7.495 | 1.43 | | |
| 27 | ∞ | 10.50 | 1.95375 | 32.3 |
| 28 | ∞ | 0.30 | | |
| 29 | 13.143 | 1.95 | 1.69680 | 55.5 |
| 30 | −22.172 | 4.00 | | |
| 31 | ∞ | 1.40 | 1.51633 | 64.1 |
| 32 | ∞ | 0.82 | | |
| Image Plane | ∞ | | | |

Aspheric Surface Data

16th Surface

K = −5.70653e−001
A4 = −1.19024e−005
A6 = −5.25474e−008
A8 = 1.89021e−009

17th Surface k = −2.76204e+002
A4 = 5.71529e−006
A6 = 1.42548e−007

22th Surface k = −1.66727e+000
A4 = 2.80706e−005
A6 = −4.99735e−007

Various Data
Zoom Ratio 34.93

| | Wide Angle | Middle | Telephoto |
|---|---|---|---|
| Focal Length | 4.41 | 43.36 | 154.00 |
| F-NUMBER | 1.65 | 2.94 | 4.90 |
| Half Angle of View (degs.) | 34.23 | 3.96 | 1.12 |
| Image Height | 3.00 | 3.00 | 3.00 |
| Lens Total Length | 94.50 | 94.50 | 94.50 |
| BF | 5.75 | 5.75 | 5.75 |
| d7 | 0.60 | 23.37 | 28.36 |
| d14 | 28.76 | 5.99 | 1.00 |
| d21 | 7.43 | 2.28 | 9.38 |
| d24 | 2.64 | 7.78 | 0.69 |

[unit: mm]

| Unit | Start Surface | Focal Length |
|---|---|---|
| Zooming lens unit Data | | |
| 1 | 1 | 40.16 |
| 2 | 8 | −5.24 |
| 3 | 15 | 23.80 |
| 4 | 22 | 14.35 |
| 5 | 25 | 24.50 |
| Fifth lens unit Data | | |
| 5a | 25 | −9.08 |
| 5b | 29 | 12.12 |

[Numerical Data 3]

[unit: mm]

Surface Data

| Surface No. i | ri | di | ndi | vdi |
|---|---|---|---|---|
| 1 | 75.072 | 1.25 | 1.84666 | 23.9 |
| 2 | 42.077 | 5.16 | 1.59522 | 67.7 |
| 3 | 275.653 | 0.10 | | |
| 4 | 48.620 | 3.83 | 1.59522 | 67.7 |
| 5 | 290.060 | 0.10 | | |
| 6 | 38.246 | 2.80 | 1.59522 | 67.7 |
| 7 | 73.110 | (Variable) | | |
| 8 | 645.649 | 0.45 | 2.00100 | 29.1 |
| 9 | 7.918 | 2.50 | | |
| 10 | −24.210 | 1.09 | 1.92286 | 18.9 |
| 11 | −11.638 | 0.40 | 2.00100 | 29.1 |
| 12 | 36.437 | 0.20 | | |
| 13 | 17.325 | 2.38 | 1.92286 | 18.9 |
| 14 | −13.083 | 0.40 | 2.00100 | 29.1 |
| 15 | −3317.995 | (Variable) | | |
| 16(Stop) | ∞ | 1.00 | | |
| 17* | 11.297 | 5.24 | 1.76802 | 49.2 |
| 18* | −62.548 | 0.80 | | |
| 19 | 19.527 | 0.55 | 2.00100 | 29.1 |
| 20 | 9.075 | (Variable) | | |
| 21* | 11.849 | 3.34 | 1.76802 | 49.2 |
| 22 | −15.947 | 0.50 | 2.10205 | 16.8 |
| 23 | −29.341 | (Variable) | | |
| 24 | 39.717 | 0.50 | 1.88300 | 40.8 |
| 25 | 8.483 | 1.35 | | |
| 26 | ∞ | 9.50 | 1.95375 | 32.3 |
| 27 | ∞ | 0.30 | | |
| 28 | 11.703 | 1.88 | 1.51742 | 52.4 |
| 29 | −57.267 | 4.30 | | |
| 30 | ∞ | 1.44 | 1.51633 | 64.1 |
| 31 | ∞ | 0.50 | | |
| Image Plane | ∞ | | | |

Aspheric Surface Data

17th Surface k = −5.60023e−001
A4 = −1.74736e−005
A6 = 7.47031e−008
A8 = 4.61435e−010
A10 = 3.61807e−012

18th Surface k = −1.02773e+001
A4 = 4.96465e−005
A6 = −1.58566e−008

[unit: mm]

21th Surface k = −2.12509e+000
A4 = 9.38800e−005
A6 = −4.21590e−007

Various Data
Zoom Ratio 25.01

| | Wide Angle | Middle | Telephoto |
|---|---|---|---|
| Focal Length | 4.30 | 41.27 | 107.51 |
| F-NUMBER | 1.60 | 2.30 | 2.80 |
| Half Angle of View (degs.) | 32.42 | 4.16 | 1.60 |
| Image Height | 2.73 | 3.00 | 3.00 |
| Lens Total Length | 95.43 | 95.43 | 95.43 |
| BF | 5.75 | 5.75 | 5.75 |
| d7 | 0.60 | 28.07 | 34.11 |
| d15 | 34.60 | 7.12 | 1.09 |
| d20 | 7.81 | 2.96 | 5.90 |
| d23 | 1.06 | 5.90 | 2.96 |

| Unit | Start Surface | Focal Length |
|---|---|---|
| Zooming lens unit Data | | |
| 1 | 1 | 48.54 |
| 2 | 8 | −6.49 |
| 3 | 16 | 26.44 |
| 4 | 21 | 12.66 |
| 5 | 24 | 1000000.00 |
| Fifth lens unit Data | | |
| 5a | 24 | −12.31 |
| 5b | 28 | 18.96 |

[Numerical Data 4]

[unit: mm]

Surface Data

| Surface No. i | ri | di | ndi | vdi |
|---|---|---|---|---|
| 1 | 84.334 | 1.25 | 1.84666 | 23.9 |
| 2 | 46.682 | 5.31 | 1.59522 | 67.7 |
| 3 | 389.475 | 0.10 | | |
| 4 | 53.343 | 4.25 | 1.59522 | 67.7 |
| 5 | 375.565 | 0.10 | | |
| 6 | 40.115 | 2.81 | 1.59522 | 67.7 |
| 7 | 68.850 | (Variable) | | |
| 8 | 72.907 | 0.45 | 2.00100 | 29.1 |
| 9 | 7.840 | 2.38 | | |
| 10 | −21.115 | 1.84 | 1.92286 | 18.9 |
| 11 | −6.506 | 0.40 | 2.00100 | 29.1 |
| 12 | 33.665 | 0.99 | | |
| 13 | 21.718 | 1.98 | 1.92286 | 18.9 |
| 14 | −36.528 | 0.40 | 2.00100 | 29.1 |
| 15 | −1102.823 | (Variable) | | |
| 16(Stop) | ∞ | 1.00 | | |
| 17* | 11.172 | 5.20 | 1.76802 | 49.2 |
| 18* | −107.146 | 0.15 | | |
| 19 | 17.772 | 0.55 | 1.95375 | 32.3 |
| 20 | 8.910 | (Variable) | | |
| 21* | 13.136 | 4.06 | 1.69350 | 53.2 |
| 22 | −14.003 | 0.50 | 2.10205 | 16.8 |
| 23 | −24.078 | (Variable) | | |
| 24 | 33.041 | 0.50 | 1.77250 | 49.6 |
| 25 | 8.446 | 11.28 | | |
| 26 | 12.478 | 0.50 | 2.10205 | 16.8 |
| 27 | 11.788 | 1.92 | 1.69350 | 53.2 |
| 28* | −64.457 | 4.30 | | |

-continued

[unit: mm]

| | | | | |
|---|---|---|---|---|
| 29 | ∞ | 1.44 | 1.51633 | 64.1 |
| 30 | ∞ | 0.50 | | |
| Image Plane | ∞ | | | |

Aspheric Surface Data

17th Surface k = −6.85314e−001
A4 = 4.88600e−007
A6 = 1.75062e−008
A8 = 6.87319e−010
A10 = −6.78625e−012

18th Surface k = −2.56380e+001
A4 = 4.34115e−005
A6 = −1.62230e−007

21th Surface k = −9.99808e−001
A4 = 6.77253e−006
A6 = −3.01779e−008
A8 = 1.66360e−009

28th Surface k = −1.57848e+000
A4 = −5.19192e−005
A6 = 4.40893e−007

Various Data
Zoom Ratio 25.00

| | Wide Angle | Middle | Telephoto |
|---|---|---|---|
| Focal Length | 4.25 | 31.96 | 106.25 |
| F-NUMBER | 1.60 | 2.10 | 2.50 |
| Half Angle of View (degs.) | 32.71 | 5.36 | 1.62 |
| Image Height | 2.73 | 3.00 | 3.00 |
| Lens Total Length | 95.97 | 102.02 | 105.52 |
| BF | 5.75 | 5.75 | 5.75 |
| d7 | 0.60 | 29.83 | 38.42 |
| d15 | 33.23 | 10.04 | 4.95 |
| d20 | 7.88 | 2.81 | 6.05 |
| d23 | 0.60 | 5.67 | 2.43 |

| Unit | Start Surface | Focal Length |
|---|---|---|
| Zooming lens unit Data | | |
| 1 | 1 | 53.12 |
| 2 | 8 | −6.25 |
| 3 | 16 | 27.78 |
| 4 | 21 | 14.93 |
| 5 | 24 | 21.88 |
| Fifth lens unit Data | | |
| 5a | 24 | −14.82 |
| 5b | 26 | 15.56 |

[Numerical Data 5]

[unit: mm]

Surface Data

| Surface No. i | ri | di | ndi | vdi |
|---|---|---|---|---|
| 1 | 64.636 | 1.25 | 2.00069 | 25.5 |
| 2 | 40.259 | 5.01 | 1.49700 | 81.5 |
| 3 | 391.301 | 0.10 | | |
| 4 | 42.660 | 3.39 | 1.59522 | 67.7 |

-continued

[unit: mm]

| | | | | |
|---|---|---|---|---|
| 5 | 240.889 | 0.10 | | |
| 6 | 37.683 | 2.36 | 1.59522 | 67.7 |
| 7 | 73.692 | (Variable) | | |
| 8 | 209.196 | 0.40 | 1.88202 | 37.2 |
| 9* | 6.229 | 3.98 | | |
| 10 | −20.730 | 0.40 | 2.00100 | 29.1 |
| 11 | 56.873 | 0.20 | | |
| 12 | 15.713 | 2.36 | 1.95906 | 17.5 |
| 13 | −16.763 | 0.40 | 2.00100 | 29.1 |
| 14 | 58.806 | (Variable) | | |
| 15(Stop) | ∞ | 0.50 | | |
| 16* | 10.537 | 4.49 | 1.69350 | 53.2 |
| 17* | −62.242 | 0.20 | | |
| 18 | 11.382 | 0.80 | 2.00100 | 29.1 |
| 19 | 7.816 | (Variable) | | |
| 20* | 12.419 | 2.74 | 1.55332 | 71.7 |
| 21 | −11.222 | 0.50 | 1.92286 | 18.9 |
| 22 | −18.307 | (Variable) | | |
| 23 | 133.906 | 0.50 | 1.88300 | 40.8 |
| 24 | 9.170 | 0.97 | | |
| 25 | ∞ | 8.00 | 1.90366 | 31.3 |
| 26 | ∞ | 3.30 | | |
| 27 | 11.299 | 1.69 | 1.54814 | 45.8 |
| 28 | −29.479 | 4.30 | | |
| 29 | ∞ | 1.44 | 1.51633 | 64.1 |
| 30 | ∞ | 0.50 | | |
| Image Plane | ∞ | | | |

Aspheric Surface Data

9th Surface k = −1.46424e−001
A6 = −7.57898e−007
A8 = 2.90676e−008

16th Surface k = −9.40436e−001
A4 = 3.75799e−005
A6 = −3.80078e−007
A8 = 1.13048e−008

17th Surface k = −2.48207e+002
A4 = −3.08650e−005
A6 = 9.95002e−007

20th Surface k = 2.35209e+000
A4 = −1.94932e−004
A6 = −4.64176e−006

Various Data
Zoom Ratio 50.01

| | Wide Angle | Middle | Telephoto |
|---|---|---|---|
| Focal Length | 3.36 | 45.82 | 168.00 |
| F-NUMBER | 1.80 | 3.20 | 5.40 |
| Half Angle of View (degs.) | 38.79 | 3.75 | 1.02 |
| Image Height | 2.70 | 3.00 | 3.00 |
| Lens Total Length | 96.75 | 96.75 | 96.75 |
| BF | 5.75 | 5.75 | 5.75 |
| d7 | 0.80 | 29.53 | 35.92 |
| d14 | 41.03 | 8.09 | 1.00 |
| d19 | 4.83 | 2.67 | 9.73 |
| d22 | 0.70 | 7.06 | 0.70 |

| Unit | Start Surface | Focal Length |
|---|---|---|
| Zooming lens unit Data | | |
| 1 | 1 | 48.05 |
| 2 | 8 | −5.69 |

-continued

[unit: mm]

| | | |
|---|---|---|
| 3 | 15 | 20.00 |
| 4 | 20 | 16.54 |
| 5 | 23 | 35.13 |
| Fifth lens unit Data | | |
| 5a | 23 | −11.17 |
| 5b | 27 | 15.12 |

TABLE 1

| Conditional Expression | Numerical Data 1 | Numerical Data 2 | Numerical Data 3 | Numerical Data 4 | Numerical Data 5 |
|---|---|---|---|---|---|
| (1) | 0.492 | 0.782 | 0.529 | 0.761 | 0.759 |
| (2) | 7.38 | 7.67 | 7.48 | 8.50 | 8.44 |
| (3) | −1.82 | −1.14 | −1.54 | −1.69 | −1.15 |
| (4) | 0.517 | 0.750 | 0.649 | 0.952 | 0.739 |
| (5) | 1.57 | 1.56 | 1.54 | 1.44 | 1.60 |
| (6) | 0.259 | 0.282 | 0.260 | 0.269 | 0.271 |
| (7) | 81.5 | 76.9 | 67.7 | 67.7 | 72.3 |
| (8) | 31.8 | 46.7 | 17.8 | 18.9 | 36.4 |
| (9) | 1.979 | 1.979 | 1.970 | 1.970 | 1.961 |
| (10) | 5.24 | 5.40 | 6.15 | 6.54 | 5.95 |
| (11) | 0.110 | 0.093 | 0.118 | 0.140 | 0.098 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-216449, filed Nov. 4, 2015, which is hereby incorporated by reference herein in its entirety.

What is claimed is:

1. A zoom lens comprising, in order from an object side to an image side, a first lens unit having a positive refractive power, a second lens unit having a negative refractive power, a third lens unit having a positive refractive power, a fourth lens unit having a positive refractive power, and a fifth lens unit, wherein
the fifth lens unit does not move for zooming,
at least the second lens unit and the fourth lens unit move during zooming to change an interval between the third lens unit and the fourth lens unit and an interval between the fourth lens unit and the fifth lens unit such that an interval between the first lens unit and the second lens unit at a telephoto end is larger than that at a wide angle end and an interval between the second lens unit and the third lens unit at the telephoto end is smaller than that at the wide angle end,
the fifth lens unit includes, in order from the object side to the image side, a first lens subunit having a negative refractive power, a reflector that bends an optical path, and a second lens subunit having a positive refractive power, and
the zoom lens satisfies the following conditional expression:

$$0.40 < -d5ab/f5a < 1.00$$

where f5a is a focal length of the first lens subunit and d5ab is an optical distance of an interval between the first lens subunit and the second lens subunit.

2. The zoom lens according to claim 1, wherein the zoom lens satisfies the following conditional expression:

$$7.0 < -f1/f2 < 10.0$$

where f1 is a focal length of the first lens unit, and f2 is a focal length of the second lens unit.

3. The zoom lens according to claim 1, wherein the first lens subunit consists of a single negative lens, and the zoom lens satisfies the following conditional expression:

$$-2.0 < (R5ar+R5af)/(R5ar-R5af) < -0.9$$

where R5af is a radius of curvature of a lens surface of the negative lens on the object side, and R5ar is a radius of curvature of a lens surface of the negative lens on the image side.

4. The zoom lens according to claim 1, wherein the second lens subunit consists of a single positive lens component.

5. The zoom lens according to claim 1, wherein the zoom lens satisfies the following conditional expression:

$$0.3 < |f5a/f5b| < 1.2$$

where f5b is a focal length of the second lens subunit.

6. The zoom lens according to claim 1, wherein the zoom lens satisfies the following conditional expression:

$$1.30 < \beta5 < 2.00$$

where $\beta5$ is a lateral magnification of the fifth lens unit.

7. The zoom lens according to claim 1, wherein the zoom lens satisfies the following conditional expression:

$$0.22 < d5i/d15w < 0.40$$

where d5i is a sum of a distance of a back focal length in air and a distance on an optical axis between lens surfaces of the fifth lens unit closest to an object and an image, respectively.

8. The zoom lens according to claim 1, wherein the third lens unit includes a positive lens and a negative lens.

9. The zoom lens according to claim 1, wherein the first lens unit includes a plurality of positive lenses, and the zoom lens satisfies the following conditional expression:

$$65.0 < vd1p < 90.0$$

where vd1p is an average Abbe number for d-line of materials of the positive lenses in the first lens unit.

10. The zoom lens according to claim 1, wherein the zoom lens satisfies the following conditional expression:

$$13.0 < \beta2t/\beta2w < 60.0$$

where $\beta2w$ and $\beta2t$ are lateral magnifications of the second lens unit at the wide angle end and the telephoto end, respectively.

11. The zoom lens according to claim 1, wherein the second lens unit includes a plurality of lenses, and the zoom lens satisfies the following conditional expression:

$$1.90 < nd2a < 2.10$$

where nd2a is an average refractive index for d-line of materials of the lenses in the second lens unit.

12. The zoom lens according to claim 1, wherein the zoom lens satisfies the following conditional expression:

$$4.8 < f3/fw < 8.0$$

where f3 is a focal length of the third lens unit, and fw is a focal length of the zoom lens at the wide angle end.

13. The zoom lens according to claim 1, wherein the second lens unit includes at least three negative lenses and a positive lens.

14. The zoom lens according to claim 1, wherein the zoom lens satisfies the following conditional expression:

$$0.04 < f4/ft < 0.18$$

where f4 is a focal length of the fourth lens unit, and ft is a focal length of the zoom lens at the telephoto end.

15. The zoom lens according to claim 1, wherein the first lens unit and the third lens unit do not move for zooming, and
during zooming from the wide angle end to the telephoto end, the second lens unit moves toward the image side, and the fourth lens unit moves toward the object side and then toward the image side.

16. The zoom lens according to claim 1, wherein the third lens unit does not move for zooming, and
during zooming from the wide angle end to the telephoto end, the first lens unit moves toward the object side, the second lens unit moves toward the image side, and the fourth lens unit moves toward the object side and then toward the image side.

17. The zoom lens according to claim 1, wherein the first lens unit does not move for zooming,
the third lens unit moves during zooming, and
during zooming from the wide angle end to the telephoto end, the second lens unit moves toward the image side, and the fourth lens unit moves toward the object side and then toward the image side.

18. The zoom lens according to claim 1, wherein the fourth lens unit moves during focusing.

19. The zoom lens according to claim 1, wherein the zoom lens forms an image on an image pickup element.

20. An image pickup apparatus, comprising:
a zoom lens; and
an image pickup element configured to receive an image formed by the zoom lens,
the zoom lens comprising, in order from an object side to an image side: a first lens unit having a positive refractive power, a second lens unit having a negative refractive power, a third lens unit having a positive refractive power, a fourth lens unit having a positive refractive power, and a fifth lens unit, wherein
the fifth lens unit does not move for zooming,
at least the second lens unit and the fourth lens unit move during zooming to change an interval between the third lens unit and the fourth lens unit and an interval between the fourth lens unit and the fifth lens unit such that an interval between the first lens unit and the second lens unit at a telephoto end is larger than that at a wide angle end and an interval between the second lens unit and the third lens unit at the telephoto end is smaller than that at the wide angle end,
the fifth lens unit includes, in order from the object side to the image side, a first lens subunit having a negative refractive power, a reflector that bends an optical path, and a second lens subunit having a positive refractive power, and
the zoom lens satisfies the following conditional expression:

$$0.40 < -d5ab/f5a < 1.00$$

where f5a is a focal length of the first lens subunit, and d5ab is an optical distance of an interval between the first lens subunit and the second lens subunit.

* * * * *